(12) United States Patent
Clarke et al.

(10) Patent No.: US 10,810,971 B2
(45) Date of Patent: Oct. 20, 2020

(54) MULTI-VIEW DISPLAY SYSTEM AND METHOD THEREFOR

(71) Applicant: Samsung Electronics Co., Ltd., Suwon-si, Gyeonggi-do (KR)

(72) Inventors: Nigel A. Clarke, Mountain View, CA (US); Sergio Perdices-Gonzalez, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/297,219

(22) Filed: Mar. 8, 2019

(65) Prior Publication Data

US 2020/0211507 A1  Jul. 2, 2020

Related U.S. Application Data

(60) Provisional application No. 62/786,725, filed on Dec. 31, 2018.

(51) Int. Cl.
*G09G 5/14* (2006.01)
*G06F 3/01* (2006.01)
*G09G 3/02* (2006.01)

(52) U.S. Cl.
CPC ............... *G09G 5/14* (2013.01); *G06F 3/011* (2013.01); *G09G 3/025* (2013.01); *G09G 2320/028* (2013.01); *G09G 2320/0257* (2013.01); *G09G 2320/068* (2013.01); *G09G 2320/0693* (2013.01); *G09G 2354/00* (2013.01)

(58) Field of Classification Search
CPC .. G09G 5/14; G09G 3/025; G09G 2320/0257; G09G 2320/068; G09G 2320/028; G09G 2320/0693; G09G 2354/00; G06F 3/011
See application file for complete search history.

(56) References Cited

U.S. PATENT DOCUMENTS

| | | | |
|---|---|---|---|
| 2007/0282682 A1 | 12/2007 | Dietz et al. | |
| 2009/0040297 A1* | 2/2009 | Harada | G02F 1/133509 348/54 |
| 2009/0168164 A1* | 7/2009 | Kean | G09F 19/14 359/463 |
| 2011/0310233 A1 | 12/2011 | Bathiche et al. | |
| 2013/0169765 A1 | 7/2013 | Park et al. | |
| 2013/0321598 A1* | 12/2013 | Inoue | G09G 3/20 348/54 |

FOREIGN PATENT DOCUMENTS

KR 10-20160051404 A 5/2016

\* cited by examiner

*Primary Examiner* — Kent W Chang
*Assistant Examiner* — Andrew Lee

(57) ABSTRACT

A method of rendering content for display on a multi-view display includes assigning a first display to a first pixel of a pixelated array, with a plurality of pixels periodically spaced along a first axis, the first display associated with a first viewing angle relative to the first axis. The method includes assigning a second display to a second pixel of the pixelated array, display associated with a second viewing angle relative to the first axis. The method further includes controlling a filter value of the first pixel based on a rendering of first content for display, and controlling a filter value of the second pixel based on a rendering of second content for display. The first viewing angle belongs to a first range of viewing angles of an optical multiplexer disposed in front of the pixelated array.

17 Claims, 20 Drawing Sheets

FIG. 4
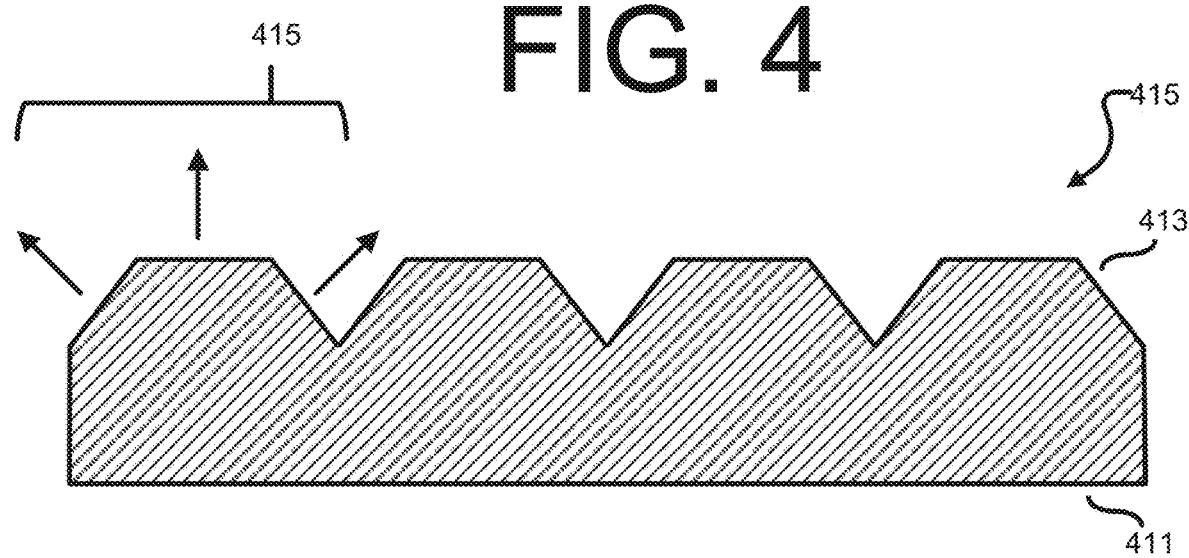
REFRACTIVE OPTICAL MULTIPLEXER
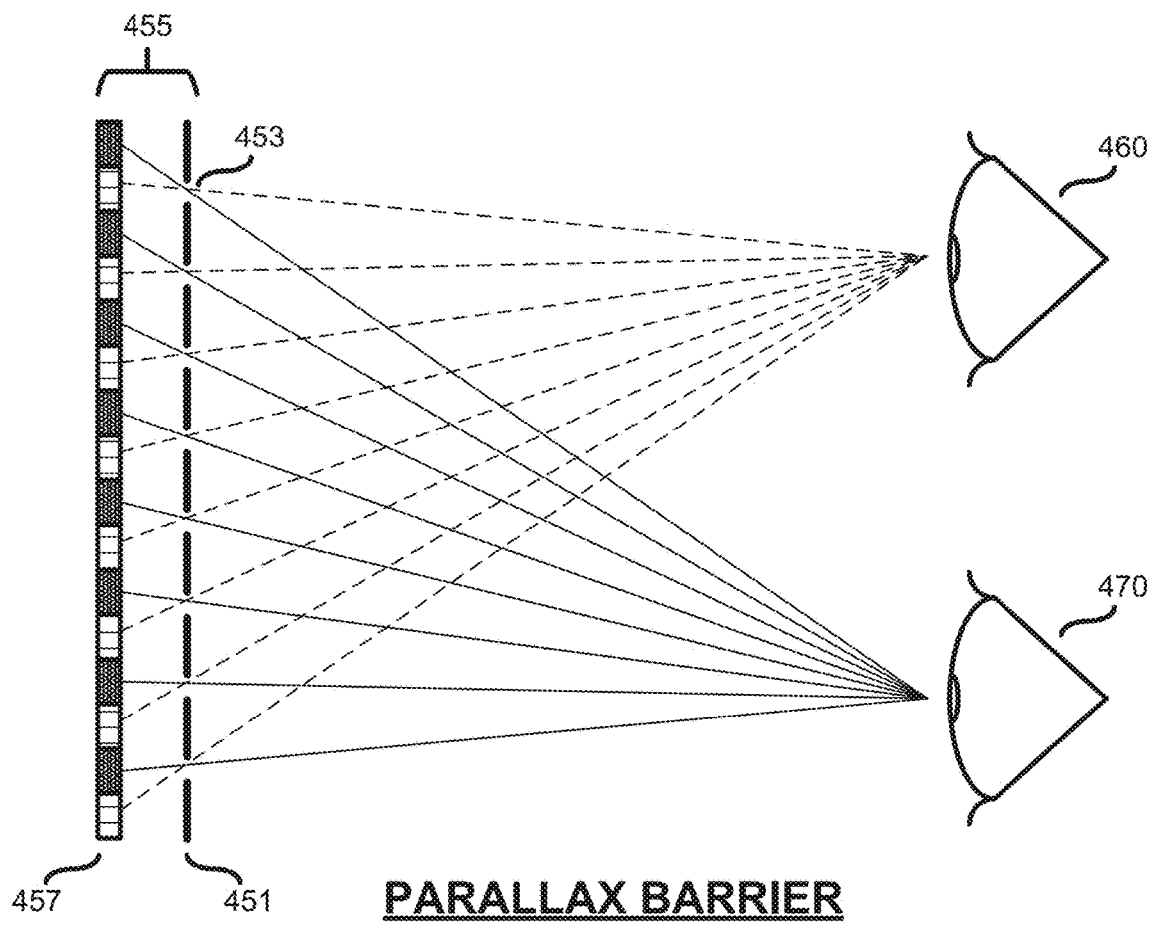
PARALLAX BARRIER

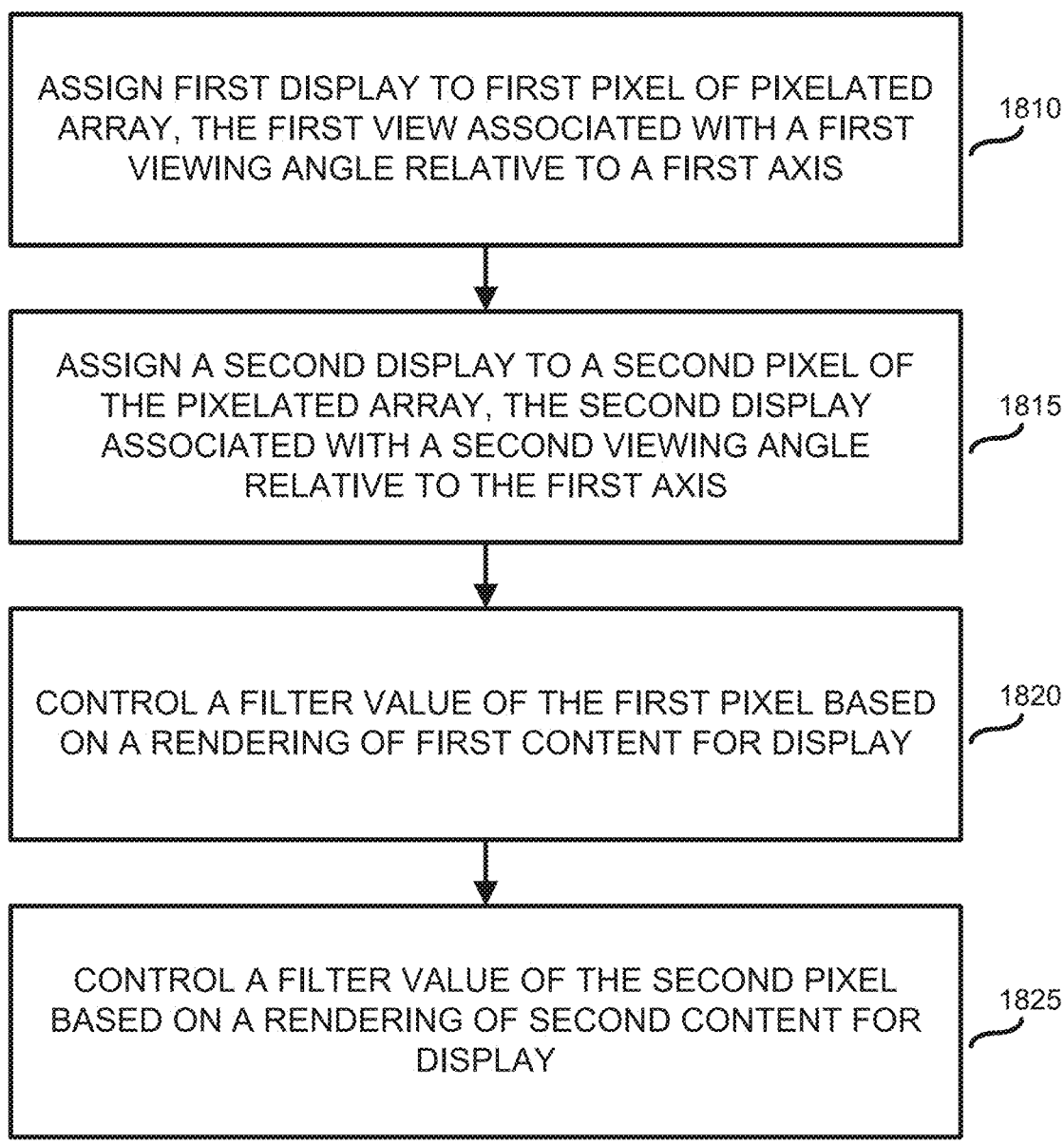

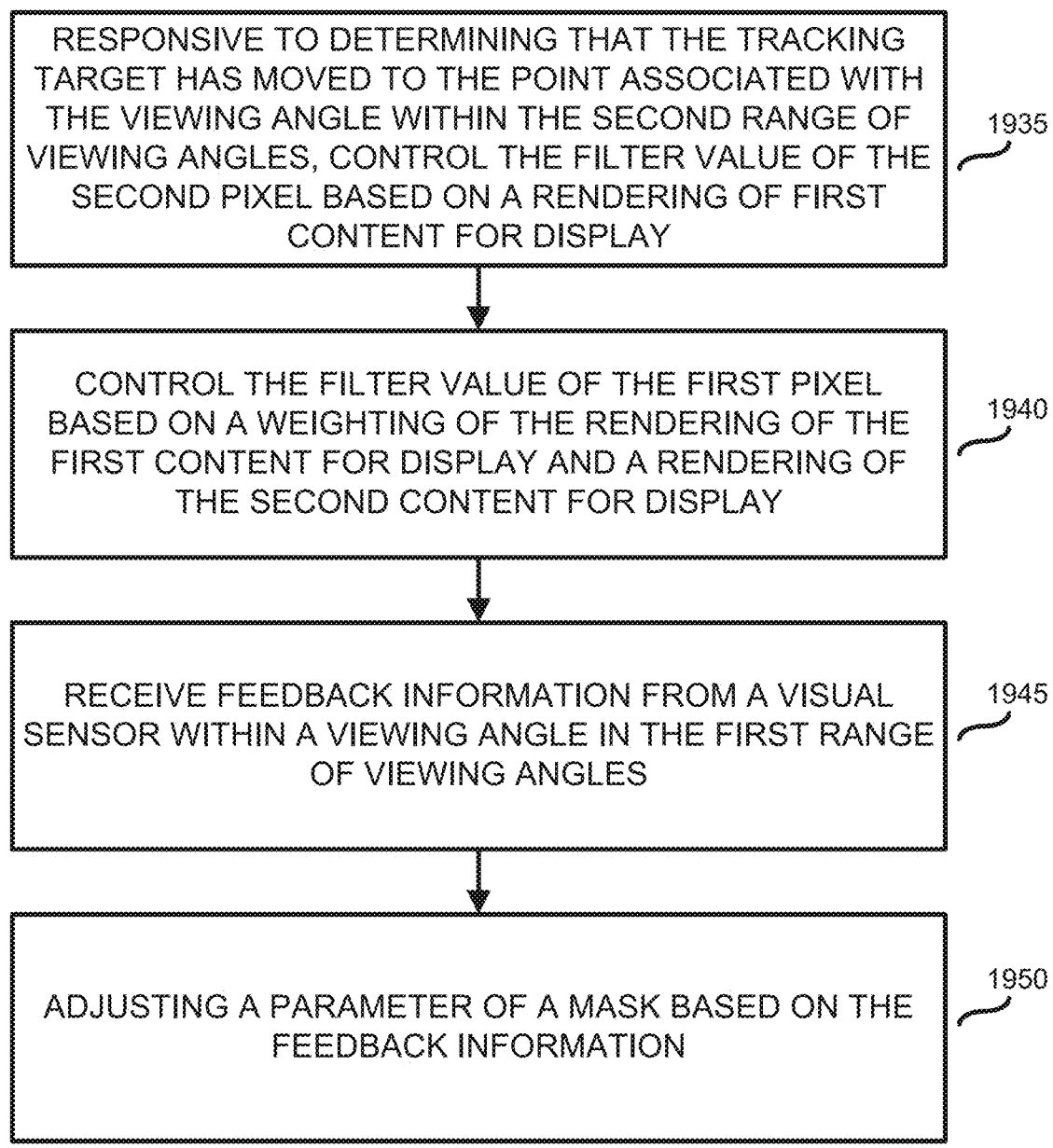

MULTI-VIEW DISPLAY SYSTEM AND METHOD THEREFOR

CROSS-REFERENCE TO RELATED APPLICATION AND CLAIM OF PRIORITY

This application claims priority under 35 U.S.C. § 119(e) to U.S. Provisional Patent Application No. 62/786,725 filed on Dec. 31, 2018. The above-identified provisional patent application is hereby incorporated by reference in its entirety.

TECHNICAL FIELD

This disclosure relates generally to electronic displays. More specifically, this disclosure relates to a multi-view display system and methods therefor.

BACKGROUND

By interposing, for example, lenticular sheets or parallax barriers over the pixelated array of a display apparatus (for example, a flat screen television or a computer monitor having a specified resolution), it is possible to provide multi-view, or directionally dependent displays, wherein a viewer looking at the display from one viewing angle sees a different image than a viewer looking at the display from a different angle.

While the ability of directional displays to provide separate displays across different viewing angles presents exciting opportunities for more effectively utilizing the energy and space consumed by the display apparatus (such as, enabling adults to watch programs of parental interest while their children watch cartoons), opportunities and technical challenges associated with realizing the potential of display apparatus which support directional displays remain. For example, controlling the directionality and resolution of displays provided by the display apparatus remains a source of opportunity and technical challenge, at both a hardware level (such as, designing enhanced lenticular arrays), and hardware control level (such as, developing methods of rendering content for display on a multi-view display in a way that reduces or eliminates "ghosting" and other undesirable visual effects).

SUMMARY

This disclosure provides a multi-view display system and methods for providing multi-view displays.

In a first embodiment, a method of rendering content for display on a multi-view display includes assigning a first display to a first pixel of a pixelated array comprising a plurality of pixels periodically spaced along a first axis, the first display associated with a first viewing angle relative to the first axis, and assigning a second display to a second pixel of the pixelated array, the second display located at a position away from the first pixel along a second axis, the second display associated with a second viewing angle relative to the first axis. The method further includes controlling a filter value of the first pixel based on a rendering of first content for display, and controlling a filter value of the second pixel based on a rendering of second content for display. According to the first embodiment, the first viewing angle belongs to a first range of viewing angles of an optical multiplexer disposed in front of the pixelated array, and the second viewing angle belongs to a second range of viewing angles of the optical multiplexer.

In a second embodiment, a multi-view display includes a plurality of pixels periodically spaced along a first axis, an optical multiplexer disposed in front of the pixelated array, and control logic. In the second embodiment, the control logic is configured to assign a first display to a first pixel of the pixelated array, the first display associated with a first viewing angle relative to the first axis, and assign a second display to a second pixel of the pixelated array, the second display located at a position away from the first pixel along a second axis, the second display associated with a second viewing angle relative to the first axis. Additionally, the control logic is configured to control a filter value of the first pixel based on a rendering of first content for display, and control a filter value of the second pixel based on a rendering of second content for display.

In a third embodiment, a non-transitory computer-readable medium includes instructions, which, when executed by a processor, cause a multi-view display to assign a first display to a first pixel of a pixelated array having a plurality of pixels periodically spaced along a first axis, the first display associated with a first viewing angle relative to the first axis, and assign a second display to a second pixel of the pixelated array, the second display located at a position away from the first pixel along a second axis, the second display associated with a second viewing angle relative to the first axis. Additionally, when executed by the processor, the computer-readable medium causes the multi-view display to control a filter value of the first pixel based on a rendering of first content for display; and control a filter value of the second pixel based on a rendering of second content for display. Further, in the second embodiment, the first viewing angle belongs to a first range of viewing angles of an optical multiplexer disposed in front of the pixelated array, and the second viewing angle belongs to a second range of viewing angles of the optical multiplexer.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates examples of optical multiplexers according to embodiments of this disclosure;

FIGS. 18, 19A, and 19B illustrate methods for providing a multi-view display according to embodiments of this disclosure.

DETAILED DESCRIPTION

FIGS. 1 through 19B, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processor-based system across a wide range of display technologies, including illuminated displays (for example, backlit displays with color filters, or organic light emitting diode (OLED) displays), as well as reflective displays (for example, displays using electronic ink, or displays using bistable materials).

Figure 1:
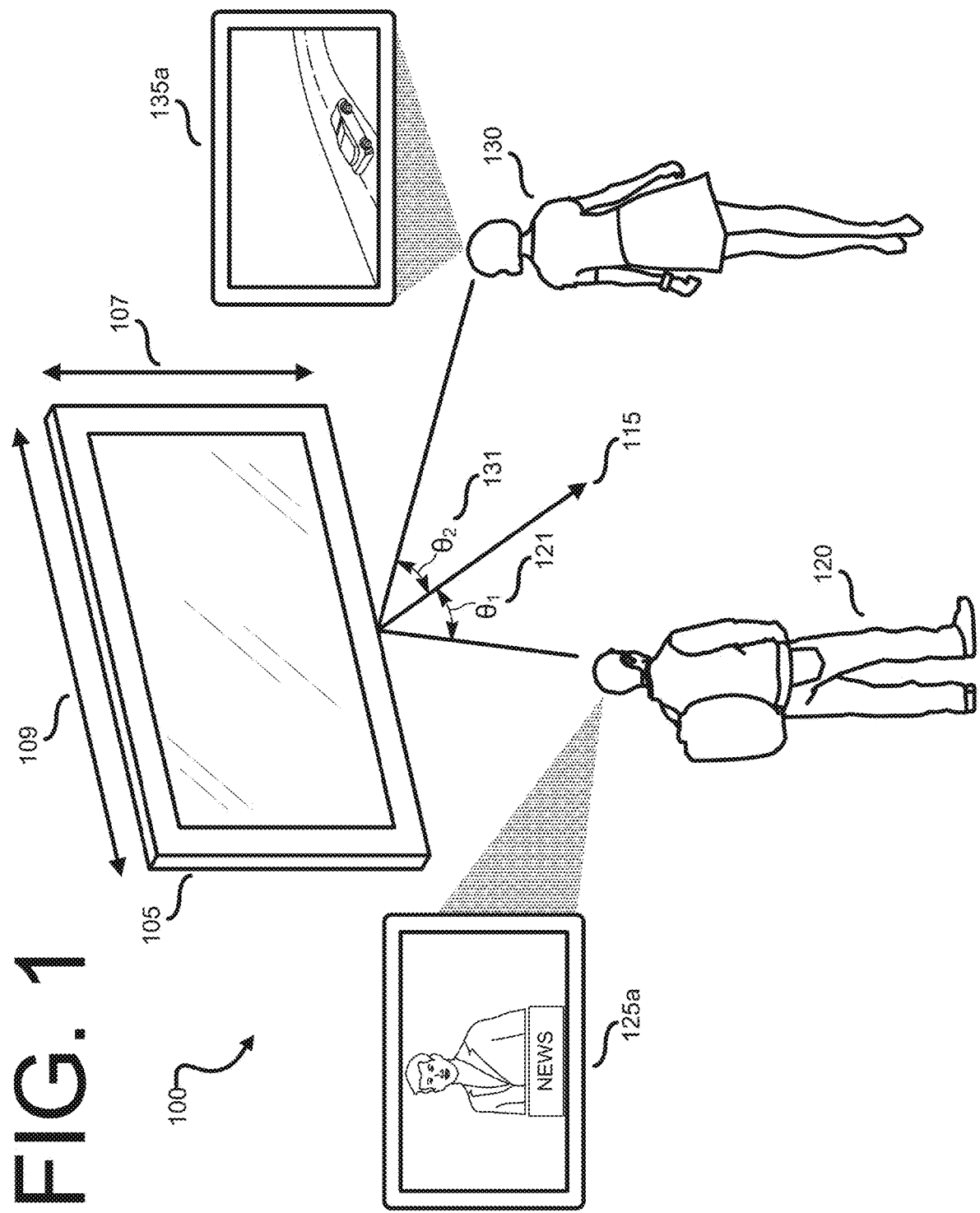
FIG. 1 illustrates an example of a scene that includes a multi-view display providing multiple directional displays according to embodiments of this disclosure.

FIG. 1 illustrates an example of a scene 100 that includes a multi-view display providing multiple directional displays, according to various embodiments of this disclosure. The embodiment of the scene 100 shown in in FIG. 1 is for illustration only and other embodiments could be used without departing from the scope of the present disclosure. In the non-limiting example shown FIG. 1, the elements of scene 100 comprise a multi-view display 105, a first viewer 120, and a second viewer 130.

In certain embodiments of this disclosure, the multi-view display 105 includes a pixelated array comprising pixels disposed in a pattern which repeats at a first spacing along a first axis 107 and at a second spacing along a second axis 109. In certain embodiments, each constituent pixel of the pixelated array may further comprise one or more subpixels (for example, a red subpixel, a green subpixel and a blue subpixel) disposed according to a subpixel pattern. In various embodiments, the multi-view display 105 further comprises an optical multiplexer, such as a lenticular array or parallax barrier, having an optical feature (for example, a curved cross section) pattern which runs along first axis 107 and repeats at a specified spacing along second axis 109. In the non-limiting example of FIG. 1, the optical multiplexer of multi-view display 105 directs light from a first set of lines of pixels of the pixelated array belonging to a first set of coordinates along second axis 109 in a first direction, and directs light from a second set of lines of pixels of the pixelated array belonging to a second set of coordinates along second axis 109 in a second direction, the second direction being different from the first direction.

According to various embodiments, the operation of the optical multiplexer of multi-view display 105 creates two directional displays. Depending upon the geometry of the repeating optical feature of the optical multiplexer, viewers within a first range of angles in a plane defined by second axis 109 and third axis 115 will primarily see images appearing on pixels from the first set of lines of pixels.

Similarly, viewers within a second range of angles in the plane defined by second axis 109 and third axis 115 will primarily see images that appear on pixels from the second set of lines of pixels.

In the non-limiting example shown FIG. 1, the first viewer 120 is looking at multi-view display 105 at a first viewing angle 121, which is within the first range of angles in the plane defined by second axis 109 and third axis 115. Accordingly, the first viewer 120 primarily sees images appearing on pixels from the first set of lines of pixels. Leveraging the fact that only a known subset of the total pixels of multi-view display 105 are visible to the first viewer 120, the pixel control logic (which can be implemented via hardware, software, or combinations thereof) within multi-view display 105, or a graphics pipeline of a source device (for example, a laptop computer or digital media player) to multi-view display 105 renders content from a first source to be presented on only pixels from the first set of lines of pixels. Accordingly, the first viewer 120 sees first directional display 125a, which displays content from a news program. Similarly, the second viewer 130 is looking at multi-view display 105 from a second viewing angle 131, which is within the second range of angles in the plane defined by second axis 109 and third axis 115. Again, due to the structure and geometry of an optical member of multi-view display 105, primarily the pixels of multi-view display 105 belonging to the second set of lines of pixels are visible to the second viewer 130. Similarly, the pixel control logic of multi-view display 105 or a graphics pipeline of a source device to multi-view display 105 renders content from a second source to be presented on only pixels from the second set of lines of pixels. Accordingly, when looking at multi-view display 105 at second viewing angle 131, the second viewer 130 sees a second directional display 135a associated with content from the second source (in this example, a driving scene from a movie).

Figure 2:
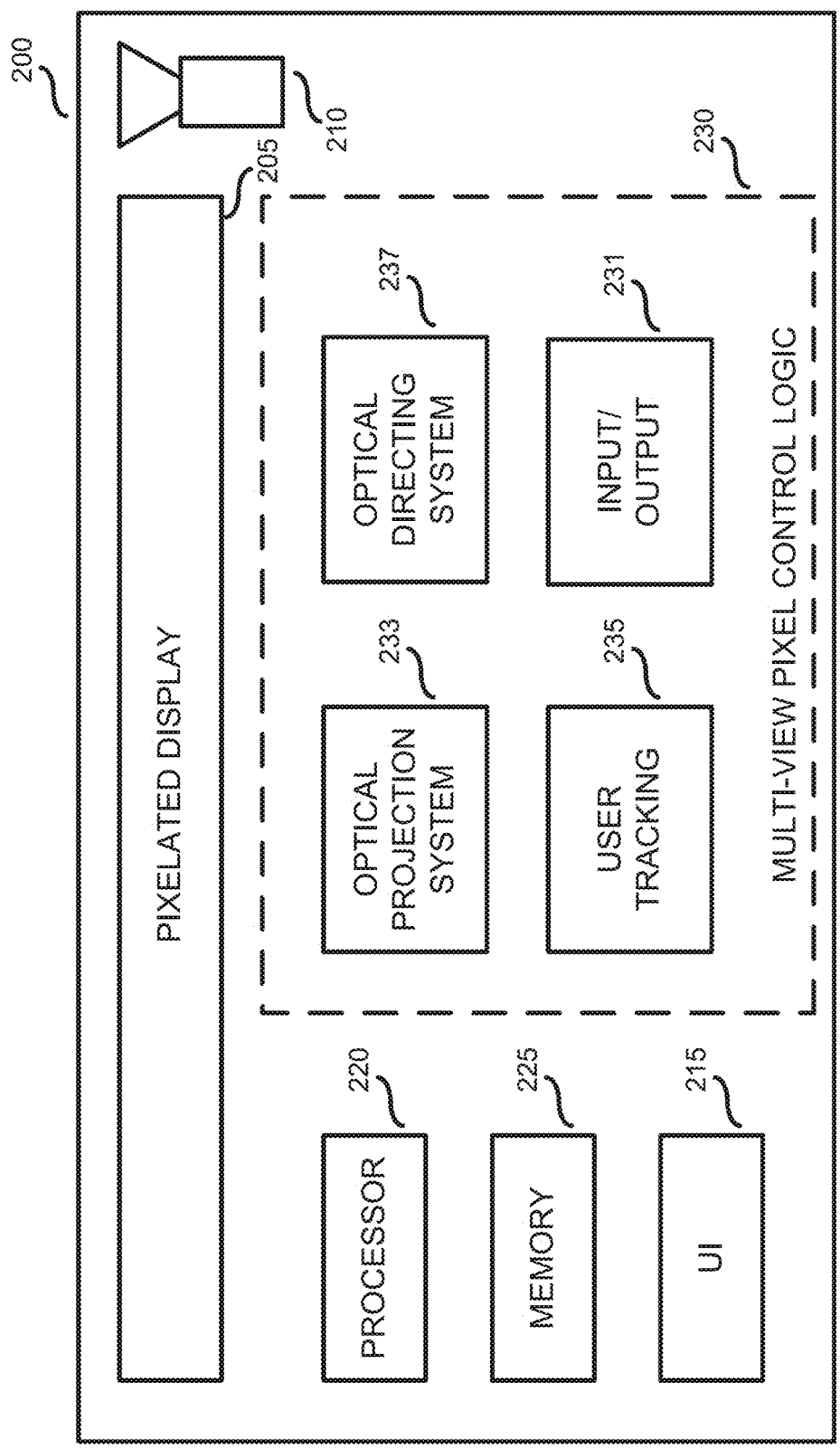
FIG. 2 illustrates a block diagram of a multi-view display according to embodiments of this disclosure.

FIG. 2 illustrates, in block diagram format, an example of a multi-view display 200 according to some embodiments of this disclosure. The embodiment of the multi-view display 200 shown in FIG. 2 is for illustration only and other embodiments could be used without departing from the scope of the present disclosure.

In the non-limiting example shown in FIG. 2, the multi-view display 200 comprises pixelated display. According to various embodiments, the pixelated display 205 comprises an array of pixels whose chromatic properties can be controlled based on a rendering of digital content for display in a directional display provided by multi-view display 200. According to some embodiments, the array of pixels comprises a backlit color filter, composed of pixels containing subpixels configured to filter the passage of light from a backlight in the color channels of a color model (for example, the red-green-blue "RGB" color model). According to certain embodiments, the array of pixels comprises an array of organic light emitting diodes (OLED), the chroma and intensity of whose emissions can be controlled to provide pixels of a specified color and brightness. In the non-limiting example of FIG. 2, pixelated display 205 further comprises an optical multiplexer (for example, a lenticular array or parallax barrier) having a pattern of optical features that repeats at predictable intervals relative to the spacing of pixels of the array of pixels. In some embodiments, the optical features of the optical multiplexer direct light from sets of lines of pixels within the array of pixels in a common direction, thereby producing two or more directional displays, wherein each directional display primarily comprises content from a given set of lines of pixels within the array of pixels. In certain embodiments according to this disclosure pixelated display 205 comprises a touchscreen display, comprising sensor elements (for example, capacitive touch sensors) for detecting tactile interactions with pixelated display 205.

According to various embodiments, multi-view display 200 comprises field sensor 210, which is configured to collect data regarding activity within one or more fields of view of the multi-view display 200. In some embodiments, field sensor 210 is a camera (for example, an RGB digital video camera utilizing a CMOS sensor to collect image data from a field of view) utilized to detect the presence and location of viewers of multi-view display 200. According to various embodiments, the field sensor is 210 is a dynamic vision sensor (DVS) sensor configured to detect changes in the intensity of light (for example, changes of light associated with a viewer moving relative to multi-view display 200) received from a field of view. In certain embodiments, the field sensor 210 comprises one or more passive infrared motion detectors (PIR) configured to detect the presence and general motion of heat emitting objects (typically humans) in one or more fields of view of multi-view display 200.

In certain embodiments according to this disclosure, field sensor 210 is physically incorporated within multi-view display 200. In some embodiments according to this disclosure, multi-view display 200 comprises a field sensor 210 which is physically separate from multi-view display 200. For example, a combination of hardware and software in a device (for example, a smartphone), whose location can be a reasonable proxy for a viewer's location may function as a field sensor, by providing multi-view display 200 data regarding the presence and motion activity of a viewer.

As shown in FIG. 2, the multi-view display 200 further comprises a user interface 215. According to certain embodiments, the user interface 215 may be a remote control for controlling the volume and channel selection, and on/off state of multi-view display 200. In some embodiments, user interface 215 is implemented as software running on a separate device (for example, smartphone) providing users with similar control over display and content parameters as a remote control. Additionally, in various embodiments, user interface 215 may support functionality for receiving feedback or other commands for tuning or adjusting one or more directional displays provided by multi-view display 200.

According to some embodiments, multi-view display 200 comprises processor 220, which comprises one or more physical processing units (for example, a central processing unit (CPU) and/or a graphics processing unit (GPU)) capable of executing instructions stored in memory 225 to implement multi-view pixel control logic 230.

In certain embodiments, the multi-view display 200 comprises memory 225, which is a non-transitory memory (for example, a solid state drive "SSD" or programmable read-only memory "PROM") containing instructions, which, when executed by processor 220, cause multi-view display 200 to implement multi-view pixel control logic 230, to control the array of pixels of pixelated display 205 to provide one or more directional displays.

As shown in the non-limiting example of FIG. 2, the multi-view pixel control logic 230 determines the placement and properties (for example, brightness and color) of rendered pixels within an array of pixels (for example, the array of pixels in pixelated display 205) to variously exploit and mitigate optical properties of an optical multiplexer (for example, the optical multiplexer in pixelated display 205), which primarily vary along a defined axis to provide one or more directional displays.

As an illustrative example, consider the case of a lenticular array (for example, a sheet of polycarbonate or another substantially transparent material having a flat back side and a front side with a corduroy-like grained surface), the directionality (for example, which viewers can see the light) of light passing through the sheet can depend substantially on the light's point of incidence on the flat first side. If the light strikes the back side of the sheet at a first point, the light may be visible to a first viewer, but not a second viewer. However, if the light strikes the back of the lenticular array at a second point laterally offset relative to the "grain" created by the optical elements of the array, the light may be steered in a different direction, and now visible to the second viewer, but not the first. According to various embodiments, multi-view pixel control logic 230 controls the points of incidence of light from an array of pixels relative to an optical multiplexer to provide and enhance a directional display provided by multi-view display 200. In some embodiments according to this disclosure, the lenticles of the lenticular array may be "reversed" such that the curved side of the array faces inwards, and the flat side of the lenticular array faces the viewer.

As shown in the non-limiting example of FIG. 2, multi-view pixel control logic 230 comprises an input-output system 231, an optical projection system 233, a user tracking system 235 and an optical directing system 237. According to various embodiments, systems 231, 233, 235 and 237 are implemented as software. In some embodiments, systems 231, 233, 235 and 237 are implemented as hardware or a combination of hardware and software.

According to certain embodiments, input/output system 231 provides an interface for, without limitation, receiving one or more items of digital content (for example, image or video data) to be rendered and presented in a directional display provided by multi-view display 200. According to some embodiments, digital content is received at input/output system 231 as rendered pixels (for example, from a graphics pipeline implemented in a source device). In various embodiments, digital content is received at input/output system in a format (for example, a video file) requiring rendering at multi-view display 200. In some embodiments, input/output system 231 comprises a suite of hardware interfaces (such as RCA or HDMI) interfaces for receiving digital content. In certain embodiments, input/output system also comprises an interface for receiving data from field sensor 210, or one or more feedback sensors in a field of view of multi-view display 200.

In some embodiments, optical projection system 233 selects which pixels of the array of pixels of pixelated display 205 digital content received at input-output system 231 is to be displayed on, as well as adjustments to the location and properties of the selected pixels based on feedback and user tracking information provided through one or more of input/output system 231, user tracking system 235, and optical directing system 237. Additionally, in certain embodiments, optical projection system 233 provides control signals for the pixels within the array of pixels of pixelated display 205.

In various embodiments of this disclosure, optical directing system 237 determines the directionality of one or more directional displays of multi-view display 200, and provides information regarding the determined directionality to optical projection system 233. According to certain embodiments, determining the directionality of a directional display comprises assigning content received via input/output system 231 to one of the ranges of viewing angles associated with an optical multiplexer. For example, when the optical multiplexer comprises a lenticular array composed of trapezoidal lens elements, which split incident light along three primary directions, determining the directionality of the directional display may comprise assigning the directional display to one of the three primary directions associated with the optical multiplexer. In other embodiments, where the properties of the optical multiplexer allow a display direction to be slightly changed in response to slight offsets in the point of incidence of light at the multiplexer, determining the directionality of a directional display can comprise determining the angular shift. According to various embodiments, optical directing system 237 receives information from user tracking system 235 to determine the directionality of one or more directional displays.

In certain embodiments according to this disclosure, user tracking system 235 receives information from one or more sensors (for example, field sensor 210) associated with the position of viewers of multi-view display 200, and provides the data to optical directing system 237 and/or optical projection system 233 for adjustments in one or more control parameters of an array of pixels (for example, a lateral offset of a rendered pixel) to be made in response to the tracked position of a user. According to various embodiments, user tracking system 235 operates in concert with touchscreen sensors provided in pixelated display 205 to provide a directional display to a viewer who is interacting with multi-view display 200 via the touchscreen sensors provided in pixelated display 205. In various embodiments according to this disclosure, the surface of pixelated display 205 provides a plurality of touchscreen user interfaces (UI) embodied as directional displays.

Figure 3:
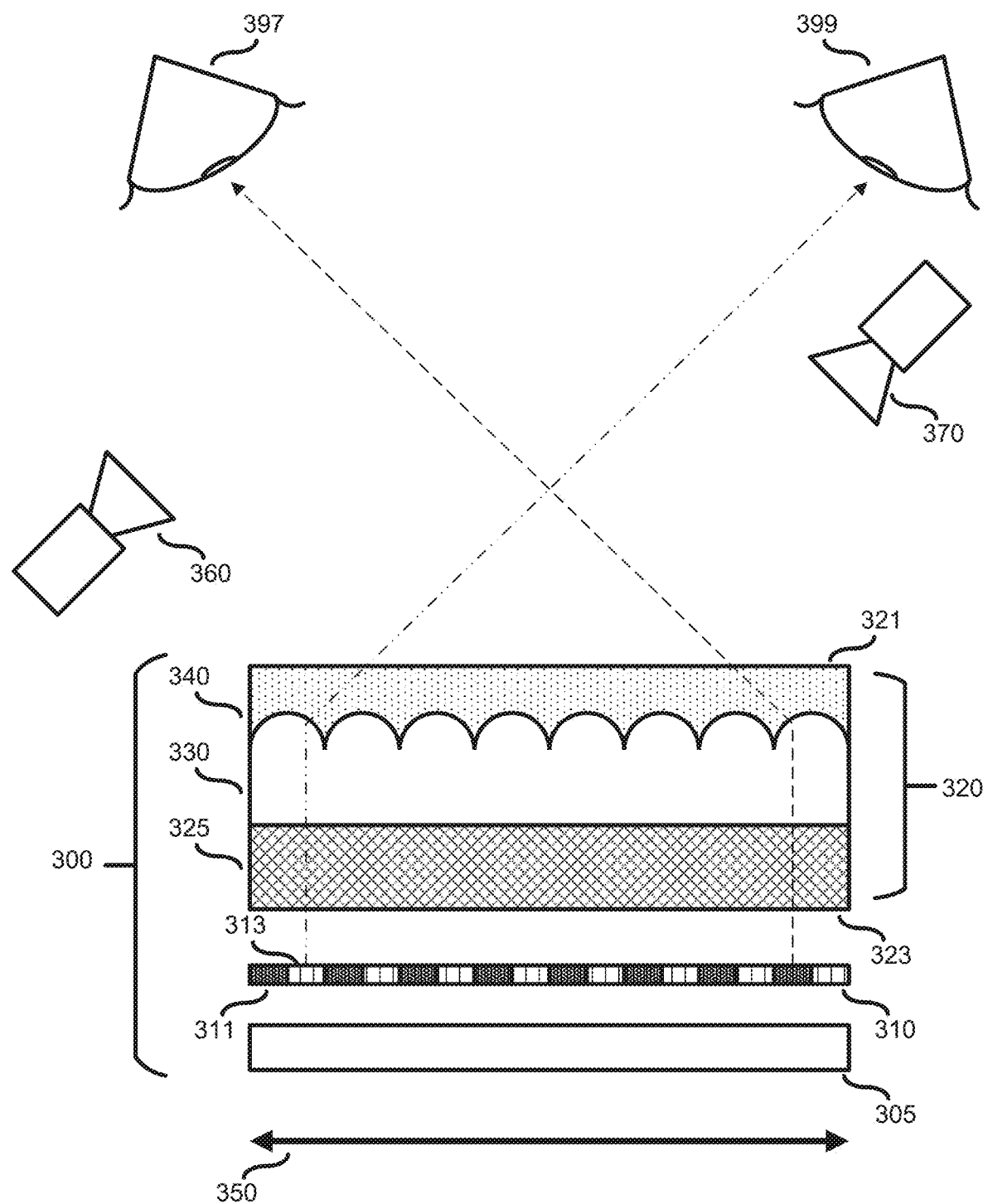
FIG. 3 illustrates components of a multi-view display according to embodiments of this disclosure.

FIG. 3 illustrates an example of components of a multi-view display 300 according to some embodiments of this disclosure. The embodiment of the multi-view display 300 shown in FIG. 3 is for illustration only and other embodiments could be used without departing from the scope of the present disclosure.

Referring to the non-limiting example of FIG. 3, a multi-view display 300 is shown, as well as a first viewing position 397 and a second viewing position 399. In this illustrative example, first viewing position 397 is disposed at an angle relative to multi-view display 300 within a first range of viewing angles, and second viewing position 399 is disposed at an angle within a second range of viewing angles. According to various embodiments, multi-view display 300 can switch between a multi-view mode and a single display mode. When multi-view display 300 is in a multi-view mode of operation, viewing positions located within the first range of viewing angles (for example, first viewing position 397) primarily see content rendered by a first set of lines of pixels of multi-view display 300, and viewing positions within the second range of viewing angles (for example, second viewing position 399) primarily see content rendered by a second set of lines of pixels of multi-view display 300.

According to certain embodiments, multi-view display 300 is constructed as a "flat screen" display (for example, a television, computer monitor, or tablet screen). In the non-limiting example of FIG. 3, multi-view display 300 comprises backlight 305, which contains one or more light sources (for example, light emitting diodes or a cold cathode fluorescent lamp ("CCFL")) emitting light at visible frequencies which can be filtered by the pixels of color filter 310. According to some embodiments, backlight 305 further comprises a diffuser or light guide to ensure that the backlight produces even light. In some embodiments, backlight 305 is dynamically and or locally controlled to improve energy consumption and the dynamic range of the display (for example, by producing darker blacks).

In some embodiments, multi-view display 300 comprises color filter 310, which is disposed between backlight 305 and first and second viewing positions 397 and 399. As shown in the illustrative example of FIG. 3, color filter 310 comprises a plurality of pixels (for example, first pixel 311 and second pixel 313) repeating at a regular spacing along axis 350. According to various embodiments, the first pixel 311 comprises one or more sub pixels associated with a color channel of a color model (for example, red-green-blue ("RGB")) through which light from backlight 305 passes. In this illustrative example, a sub-pixel comprises a liquid crystal display (LCD) filter, which is electronically controlled to control the passage of light from backlight 305 within a specified color channel. In certain embodiments, the combined operation of each subpixel of first pixel 311 allow first pixel 311 to appear as a point of light having a specified color and brightness.

In the non-limiting example shown in FIG. 3, the multi-view display 300 further comprises lenticular layer 320. According to various embodiments, lenticular layer 320 is a transparent sheet disposed between color filter 310 and first and second viewing positions 397 and 399. In certain embodiments, the lenticular layer 320 includes a substantially flat first exterior side 321 and a substantially flat second exterior side 323. In the non-limiting example shown FIG. 3, the first exterior side 321 is disposed on the exterior of multi-view display 300, and the second exterior side 323 is disposed in front of both backlight 305 and color filter 310.

According to certain embodiments, the lenticular layer 320 comprises a first layer 325, which is composed of a substantially transparent material (for example, silicon dioxide coated glass or polycarbonate). Additionally, the transparent material has an index of refraction that is uniform throughout first layer 325.

In some embodiments, the lenticular layer 320 comprises a second layer 330 which is composed of a section of material which is substantially flat on a side contacting first layer 325 and which has a lenticularly patterned cross section which repeats at a regular spacing along axis 350. According to certain embodiments, when the index of refraction of second layer 330 differs from the index of refraction of third layer 340, multi-view 300 operates in a multidirectional mode, providing two or more directional displays, wherein the lenticularly patterned cross section of second layer 330 acts as a lens, and directs the light passing from a first set of pixels within color filter 310 to a first set of viewing angles, and the light passing from a second set of pixels within color filter 310 to a second set of viewing angles. As shown in the illustrative example of FIG. 3, when the index of refraction of second layer 330 differs from the index of refraction of third layer 340, a viewer at first viewing position 397 primarily sees light filtered by a first set of pixels, which includes first pixel 311 (identified in FIG. 3 as white dots on a black background). Similarly, when the index of refraction of second layer 330 differs from the index of refraction of third layer 340, a viewer at second viewing position 399 primarily sees light filtered by a second set of pixels, which includes second pixel 313 (identified in FIG. 3 by vertical cross hatching). According to various embodiments, including embodiments where second layer 330 is constructed using liquid-crystal infiltrated micro cavities, the index of refraction of second layer 330 is variable, and can be tuned to match the index of refraction of third layer 340. In such embodiments, when the index of refraction of second layer 330 is tuned to match that of third layer 340, multi-view display 300 is no longer operating in a multidirectional mode, and viewers at first viewing position 397 and second viewing position 399 see light filtered through substantially the same set of pixels of color filter 310.

As shown in the non-limiting example of FIG. 3, the lenticular layer 320 further comprises third layer 340, which includes first exterior side 321, and a second side following the contours of the lenticular pattern of second layer 330. According to various embodiments, third layer 340 has at least one index of refraction which is different than the index of refraction of second layer 330. According to various embodiments, the index of refraction of third layer 340 is variable, and can be tuned to match the index of refraction of second layer 330 to support modes in which multi-directional display 300 provides directional displays, and modes in which viewers of multi-view display 300 see light filtered through a substantially common subset of the pixels of color filter 310.

In certain embodiments, the multi-view display 300 includes a field sensor 360. In certain embodiments, the multi-view display 300 is connected to the field sensor 360. According to various embodiments, the field sensor 360 is a field sensor (for example, field sensor in FIG. 2) configured to collect data regarding users' positions and movement and conditions of interest (for example, ambient light levels) to be provided to the control logic (for example, multi-view pixel control logic 230 in FIG. 2) for multi-view display 300. According to certain embodiments, the field sensor 360 is a digital camera configured to collect image data for facial recognition to assist in tracking users' movement across fields of view of multi-view display 300.

In certain embodiments, the multi-view display 300 includes one or more calibration sensors 370, which is a sensor configured to detect undesirable visual effects (for example, images from another directional display appearing in a directional display, also known as "ghosting") which can be corrected by the control logic of multi-view display 300 (for example, by optical projection system 233 in FIG. 2) through changes in the placement of pixels relative to second layer 330, and/or the chromatic filtering properties of pixels. According to certain embodiments, the calibration sensor 370 obtains data regarding relevant properties of multi-view display 300 (for example, variations in the angle of elements of an optical multiplexer relative to lines of pixels). In some embodiments, calibration sensor 370 comprises a digital camera.

Although FIG. 3 illustrates one example of a multi-view display, various changes may be made to FIG. 3. For example, in certain embodiments (for example, organic light-emitting diode ("OLED")) displays, a single pixelated array of light emitting diodes may serve as both backlight 305 and color filter 310. Additionally, in certain embodiments, second layer 330 may have a constant index of refraction, and the index of refraction of third layer 340 varies to match or differ from the index of refraction of second layer 330. In some embodiments, first layer 325 provides a reinforcing substrate for second layer 330, or acts as an optical spacer to position pixels of color filter 310 in the focal plane of lenticular elements of second layer 330. Further, in certain embodiments, first layer 325 of lenticular layer 320 is unnecessary and may be omitted.

FIG. 4 illustrates examples of optical multiplexers according to certain embodiments of this disclosure. The embodiment of the optical multiplexers shown in FIG. 4 is for illustration only and other embodiments could be used without departing from the scope of the present disclosure.

In the non-limiting example shown in FIG. 4, two examples of optical multiplexers are depicted. The two examples include a refractive multiplexer 401 and parallax barrier 451, both of which cause different sets of elements (for example, lines of pixels or subpixels) of a pixelated array (for example, backlit color filter 310 of FIG. 3, or an OLED array) to be primarily visible across different viewing angles relative to a common axis.

According to certain embodiments, an optical multiplexer can be a refractive multiplexer, such as refractive multiplexer 401. In some embodiments, refractive multiplexer 401 comprises a sheet of material having a first index of refraction, and a substantially flat first surface 411, which receives light from pixels of pixelated array. In various elements, refractive multiplexer 401 comprises second surface comprising a repeating pattern of optical elements 415, which define shaped boundary between the sheet of material having the first index of refraction, and a medium (for example, air, or a cover layer) having a second index of refraction. The shaped boundary between regions of dissimilar indices of refraction creates a lensing effect, dividing the output of the pixelated array in three principal directions based on the point of incidence of the pixels' output with first surface 411. When repeated across the width of the pattern of refractive multiplexer, this lensing effect divides the output of the pixelated array into three directional displays, wherein each set of directional displays is associated with one or more lines of pixels which have common points of incidence on first surface relative to an optical element in the repeating pattern of optical elements. According to certain embodiments, refractive multiplexer 401 is a static multiplexer, (for example, a molded or extruded sheet of polycarbonate) wherein the shape of optical element 415 remains constant. In various embodiments, (for example, embodiments utilizing materials whose index of refraction is tunable, or embodiments utilizing fluidic lenses) the optical properties of refractive multiplexer 401 can be reconfigured.

In some embodiments, the optical multiplexer is a parallax barrier 451. As shown in FIG. 4, parallax barrier 451 comprises a set of slits (for example, slit 453) in an opaque layer, which cause selected subsets of the pixels of a pixelated array (for example, color filter 457) to be visible at selected ranges of viewing angles. In the non-limiting example shown in FIG. 4, viewers within a first range of viewing angles, the first range of viewing angles covering first viewing position 460 only see the striped pixels of color filter 457. Similarly, viewers within a second range of viewing angles, the second range of viewing angles covering second viewing position 470 only see the "white dotted" pixels of color filter 457. According to various embodiments, parallax barrier 451 is a static parallax barrier, with the widths of the slits and distance 455 to color filter 457 remaining constant. In certain embodiments, parallax barrier 451 is actuated and adjustable, with one or more of the widths of the slits or distance 455 to color filter 457 being reconfigurable.

Figure 5:
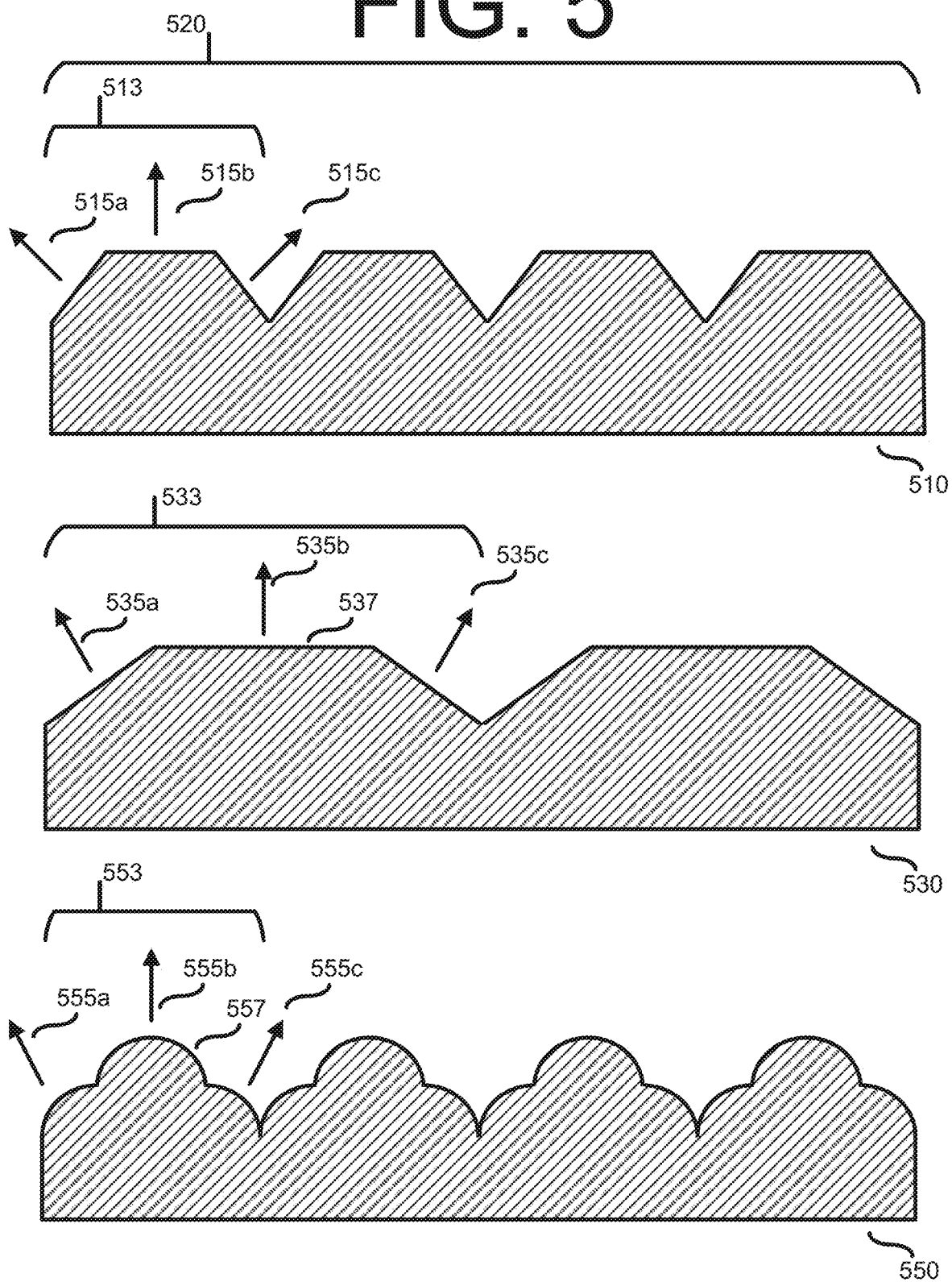
FIG. 5 illustrates examples of cross sections of refractive optical multiplexers according to embodiments of this disclosure.

FIG. 5 illustrates examples of cross sections of refractive optical multiplexers according to some embodiments of this disclosure. Specifically, FIG. 5 illustrates three sections of lenticularly patterned material suitable for use in a multi-view display (for example, multi-view display 105 in FIG. 1). The embodiment of the refractive optical multiplexer shown in FIG. 5 is for illustration only and other embodiments could be used without departing from the scope of the present disclosure.

In the non-limiting example shown in FIG. 5, a first cross section embodiment (i.e., a first section, a first portion, etc.) of lenticularly patterned material 510 comprises a section of material having at least one possible index of refraction throughout the section of material. According to some embodiments, first section of lenticularly patterned material 510 is composed of a material having a generally constant index of refraction, such as polycarbonate or glass. According to some embodiments, the first section of lenticularly patterned material 510 is constructed of a material having a controllably variable index of refraction (for example, a layer of polymer with liquid-crystal infiltrated micro cavities).

The first section of lenticularly patterned material 510 comprises a substantially flat side 511 and a second side 520 defining a lenticularly patterned cross section made up of lens elements 513 which have a common pitch and repeat at a regular spacing. According to certain embodiments, lens element 513 has a geometry that supports a first directional display visible along first viewing axis 515*a*, a second directional display visible along second viewing axis 515*b*, and a third directional display visible along third viewing axis 515*c*. In certain embodiments, the geometry of first section of lenticularly patterned material 510 is designed split the resolution of a color filter (for example, color filter 310 in FIG. 3) equally between each of the three directional displays.

A second cross section embodiment (i.e., a second section, a second portion, etc.) of lenticularly patterned material 530 is shown as part of the non-limiting example of FIG. 5. According to certain embodiments, the second section of lenticularly patterned material 530 is constructed of a material having either a fixed or variable index of refraction, and includes a substantially flat side, and a second side defining a lenticularly patterned cross section composed of lens elements (for example, lens element 533), which repeats at a regular spacing. According to various embodiments, lens element 533 has a geometry that supports a first directional display along first viewing axis 535*a*, a second directional display along second viewing axis 535*b* and a third directional display along third viewing axis 535*c*. In certain embodiments, the geometry of lens element 533 is selected to split the resolution of a color filter feeding light to the substantially flat side of second section of lenticularly patterned material 530 unequally between the first, second and third directional displays. In this illustrative example, lens element 533 includes a wide land 537, which causes a larger proportion of the pixels (relative to the first and third directional displays) of a color filter providing light to second section of lenticularly patterned material 530 to be visible as part of the second directional display. According to certain embodiments, having a higher resolution center directional display may be useful or utilized. For example, the center directional display may be displaying a movie or other item of resolution-critical content, while the side directional displays may be displaying less resolution-critical content (for example, text identifying the name and parental guidance rating of the movie being displayed through the center directional display).

A third cross section embodiment (i.e., a third section, a third portion, etc.) of lenticularly patterned material 550 is shown as part of the non-limiting example of FIG. 5. According to certain embodiments, third section of lenticularly patterned material 550 is constructed of a material having either a fixed or variable index of refraction, and includes a substantially flat side, and a second side defining a lenticularly patterned cross section composed of lens elements 553, which repeat at a regular spacing. According to various embodiments, lens element 553 has a geometry that supports a first directional display along first viewing axis 555a, a second directional display along second viewing axis 555b and a third directional display along third viewing axis 555c. In certain embodiments, lens element 553 has a geometry that divides the pixels of a color filter evenly between the first, second and third directional displays, but which includes one or more additional curves 557 to create visual effects, such as a fisheye lens effect or orthoparallactic movement within a directional display.

While the non-limiting examples of FIG. 5 illustrates sections of lenticularly patterned material with lens elements supporting three directional displays, in some embodiments, different lens geometries supporting more or fewer directional displays may be utilized.

Figure 6:
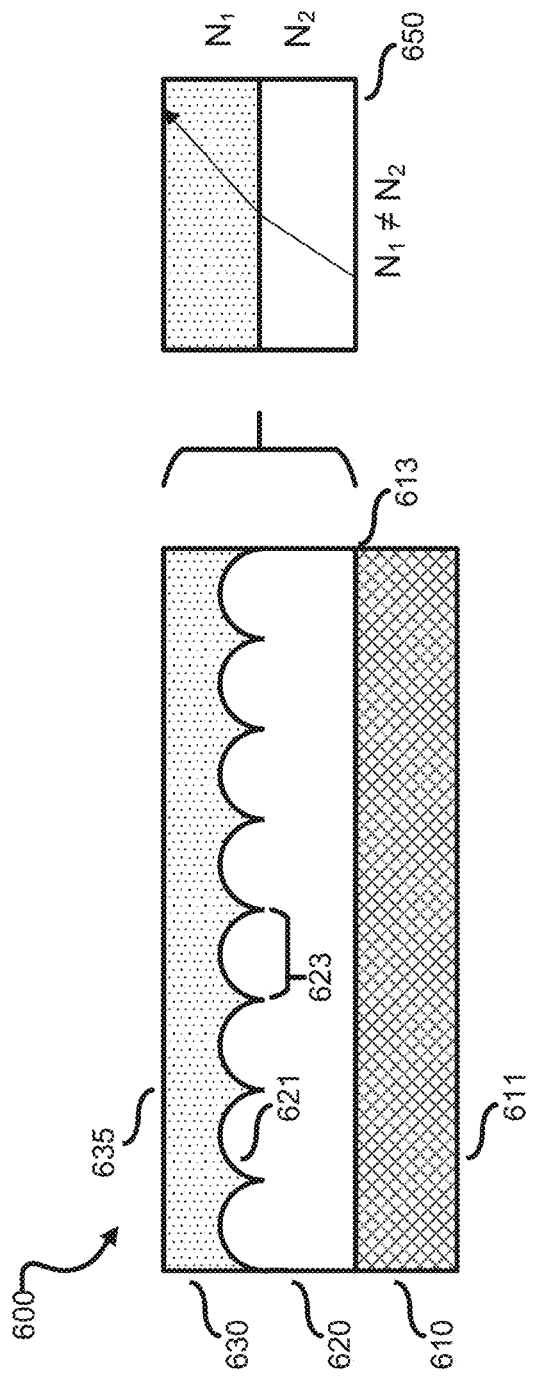
FIG. 6 illustrates an optical multiplexer constructed as a multi-index smooth lenticular layer according to embodiments of this disclosure.

FIG. 6 illustrates an example of an optical multiplexer constructed as a multi-index smooth lenticular layer 600 according to various embodiments of this disclosure. The embodiment of the optical multiplexer shown in FIG. 6 is for illustration only.

Referring to the non-limiting example of FIG. 6, the elements of a lenticular layer 600 (for example, lenticular layer 320 of FIG. 3) are illustrated. According to various embodiments, lenticular layer 600 comprises a first layer 610 (for example, first layer 325 in FIG. 3) which is composed of a section of material having a substantially uniform index of refraction throughout, and first surface 611, which is substantially flat and disposed towards a backlight, OLED array or other pixelated light source providing content to be presented through two or more directional displays, wherein viewers within a first range of viewing angles primarily see content from a first set of pixels of a color filter, and viewers within a second range of viewing angles primarily see content from a second set of pixels of the color filter. First layer 610 further comprises a second surface 613 which is substantially flat.

According to various embodiments, lenticular layer 600 further comprises a second layer 620 (for example, second layer 330 in FIG. 3), which comprises a first surface which is substantially flat and in contact with second surface 613 of first layer 610. Additionally, second layer 620 comprises a surface 621 that defines a lenticularly patterned cross section of second layer 620. According to certain embodiments, the lenticularly patterned cross section comprises a plurality of lens elements (for example, lens element 623), which repeat at a second spacing along an axis parallel to surface 613. As shown in the non-limiting example of FIG. 6, the index of refraction of second layer 620 ($N_2$) differs from an index of refraction of third layer ($N_1$), causing second layer 620 to act as an array of lenses which splits light entering the lenticular layer 600 via first layer 610 into two or more directional displays based on the light's point of incidence relative to a lens element of second layer 620. According to certain embodiments, second layer 620 has a constant or fixed, index of diffraction. In certain embodiments, second layer 620 is constructed of a material utilizing one or more of liquid crystals, phase change materials, or materials whose index of refraction can be controlled through changes in temperature, voltage, or current. In some embodiments, third layer 630 is constructed of a material whose index of refraction can be controlled, thereby producing a controllable contrast in indices of refraction along the curved boundary between second layer 620 and third layer 630.

As shown in the non-limiting example of FIG. 6, lenticular layer 600 further comprises a third layer 630. The third layer 630 includes a substantially flat surface 635, and a second surface tracking the contours of the lenticularly patterned cross section of second layer 620. According to various embodiments, third layer 630 protects second layer 620, and provides a smooth exterior surface for lenticular layer 600, providing a smooth, easy to clean (relative to a ridged surface) surface for lenticular layer 600.

Figure 7:
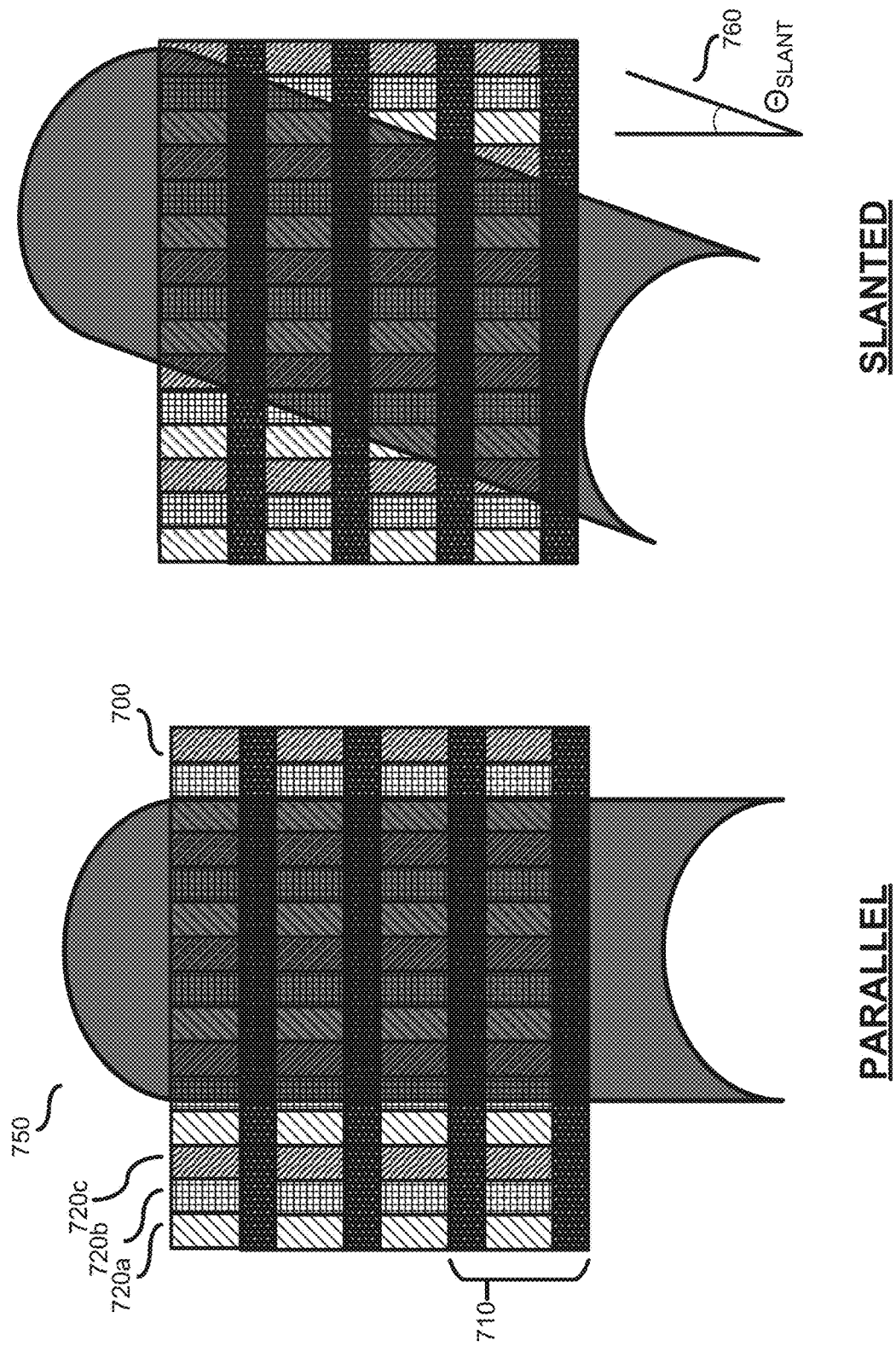
FIG. 7 illustrates two orientations of an optical element of an optical multiplexer relative to a subpixel structure of a pixelated array according to embodiments of this disclosure.

FIG. 7 illustrates an example of two orientations of an optical element of an optical multiplexer relative to a subpixel structure of a pixelated array according to certain embodiments of this disclosure. The embodiment of the example orientations of the optical element shown in FIG. 7 is for illustration only and other embodiments could be used without departing from the scope of the present disclosure. Referring to the non-limiting example of FIG. 7, two configurations of a pixelated array 700 relative to an optical element 750 of an optical multiplexer.

As shown in the illustrative example of FIG. 7, the pixelated array 700 comprises an orthogonal grid of pixels 710. According to various embodiments, each pixel of pixelated array comprises four subpixels corresponding to the color channels of a color model, wherein the subpixels are structured in each pixel according to a common subpixel pattern. In this explanatory example, first subpixel 720a provides a red filter, second subpixel 720b provides a blue filter, and third subpixel 720c provides a green filter.

Referring to the non-limiting example of FIG. 7, the optical element 750 comprises a section of a lenticularly patterned material wherein the lenticular cross section of the material runs parallel to the lines of repetition within the subpixel patterns of the pixels of pixelated array 700. For example, the magenta filters (shown by downward hatching lines, such as in subpixel 720c), are shown as being perfectly aligned with the center of optical element 750. In certain embodiments, orientation of the elements of an optical multiplexer (for example, lenses of a lenticular array or slits of a parallax barrier) can create undesirable optical effects, such as color banding arising from the lens-like shape of optical element 750 consistently magnifying subpixels of a particular color channel.

In certain embodiments, undesirable optical effects associated with alignment of the optical elements optical multiplexer with the subpixel pattern of pixelated array 700 can be mitigated by angling, or slanting the optical elements of the optical multiplexer at a slant angle 760 relative to a line along which a subpixel pattern of pixelated array 700 repeats. Additionally, slanting the optical elements of the optical multiplexer at a slant 760 splits the native resolution of pixelated array 700 between the one or more directional displays along both the x-axis and y-axis of pixelated array 700, which, depending on embodiments, can be desirable from a design and user experience perspective. As discussed elsewhere in this disclosure, in certain embodiments where an optical multiplexer is offset at a slant angle, the slant angle needs to be considered when determining the placement and properties of pixels of one or more directional displays provided by a multi-view display (for example, multi-view display 105 in FIG. 1).

Figure 8:
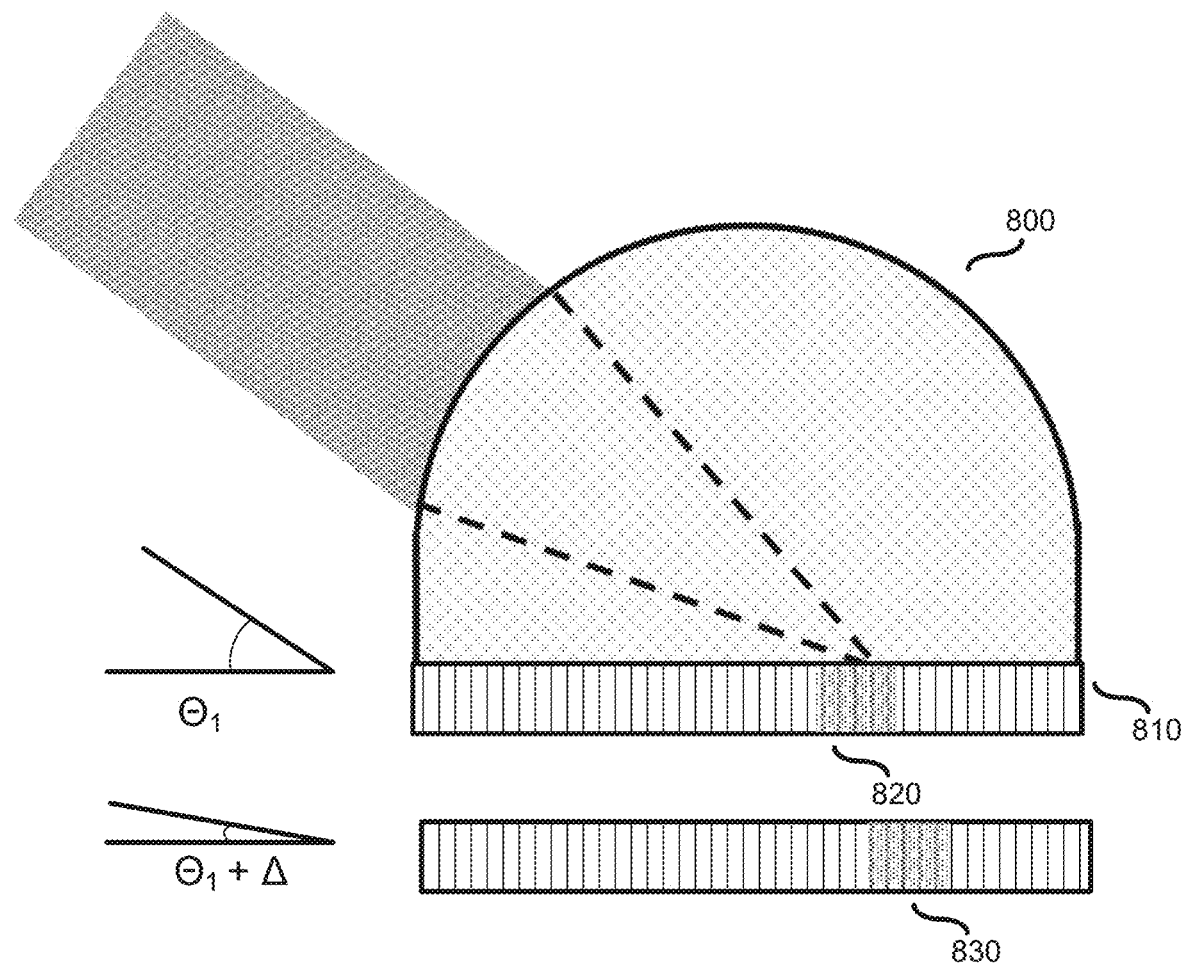
FIG. 8 illustrates aspects of a relationship between viewing angle and lateral offset in a pixelated array according to embodiments of this disclosure.

FIG. 8 illustrates aspects of a relationship between viewing angle and lateral offset in a pixelated array according to some embodiments of this disclosure. The embodiment shown in FIG. 8 is for illustration only and other embodiments could be used without departing from the scope of the present disclosure.

Referring to the non-limiting example of FIG. 8, an optical element 800 of an optical multiplexer is shown in cross section relative to a line of pixels 810 of a pixelated array (for example, an OLED array or color filter 310 in FIG. 3). In this non-limiting example, optical element 800 has a curved cross section, the curvature of which does not change discontinuously (in contrast to, for example, optical element 415 in FIG. 4). Based on the geometry of optical element 800, the index of refraction of optical element 800, and other optical properties (for example, diffractive properties), of optical element 800, light from a set of pixels rendered at location 820 passes through optical element 800 such that it is primarily directed along a direction of view associated with an angle $\Theta_1$ relative to the axis defined by the line of intersection between optical element 800 and line of pixels 810.

As shown in the illustrative example of FIG. 8, if the pixels are rendered at a location 830, which is laterally offset from location 820 by two pixels, the point of incidence of the light to optical element 800 is shifted, and the light passes through optical element 800 such that it is primarily directed along a different direction of view, associated with an angle $\Theta_1+\Delta$ relative to the axis defined by the line of intersection between optical element 800 and line of pixels 810. According to various embodiments, $\Delta$, or the change in direction associated with a lateral offset in where pixels are rendered is primarily a function of the geometry of optical element 800. In this example, the exterior of optical element 800 has a smooth, continuous curve, making it an appropriate choice for certain applications (for example, generating a directional display which follows a tracked user as she moves through a room). For other applications, a prismatic cross section for optical element 800 may be appropriate (for example, multi-player gaming applications where separating multiple directional views between players may be a priority).

Figure 9:
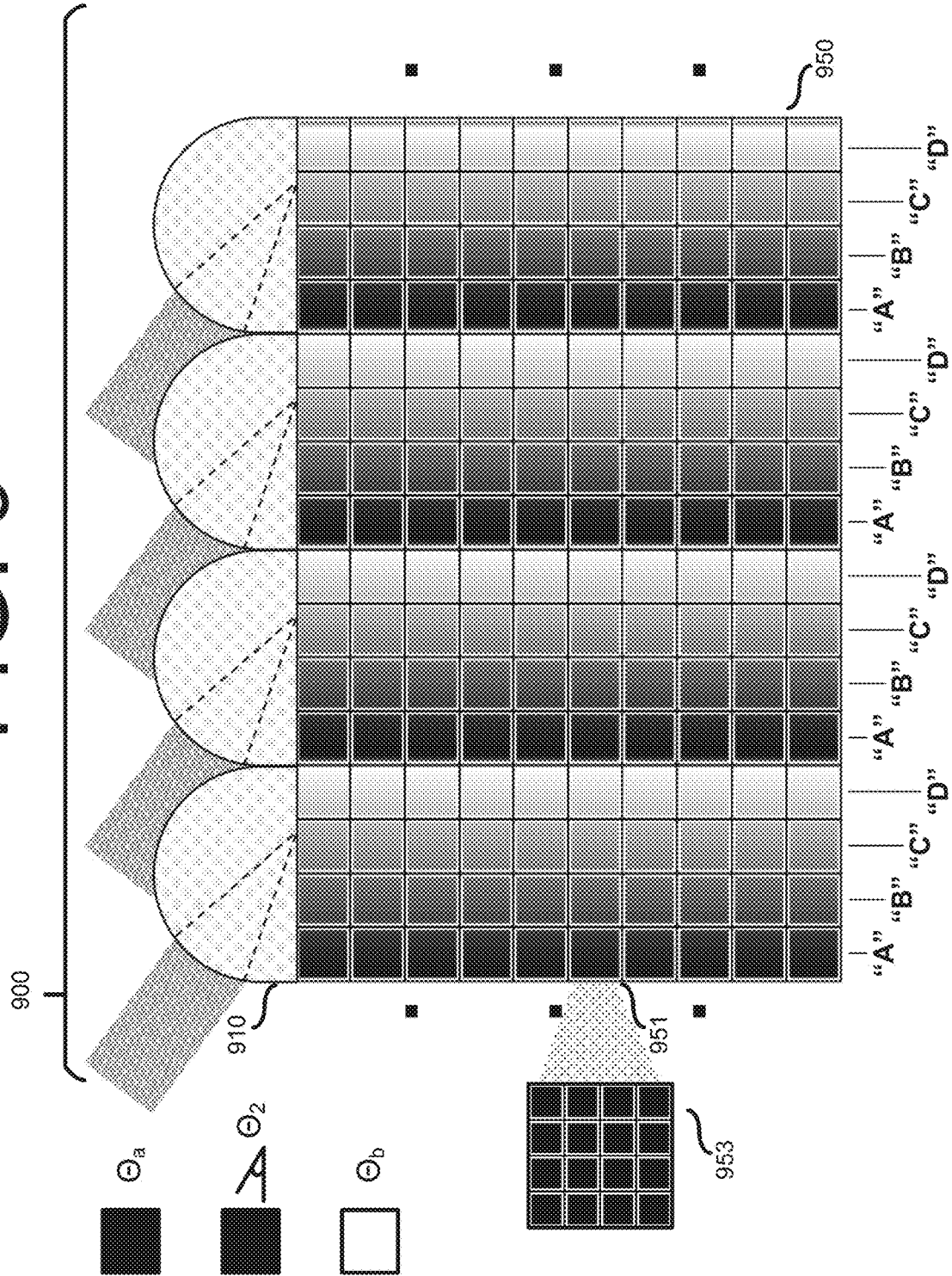
FIG. 9 illustrates aspects of a relationship between viewing angle and lateral offset according to embodiments of this disclosure.

FIG. 9 illustrates aspects of a relationship between viewing angle and lateral offset according to certain embodiments of this disclosure. The embodiment shown in FIG. 9 is for illustration only and other embodiments could be used without departing from the scope of the present disclosure.

In the non-limiting example shown in FIG. 9, a section of an optical multiplexer 900 is depicted relative to a section of a pixelated array 950. For the purposes of clarity, while only the cross section of optical multiplexer 900 is shown in FIG. 9, extrusions of the cross section of optical multiplexer covers the pixels of pixelated array 950 in parallel with the orthogonal grid of pixelated array 950 (such as, for example, how optical element 750 covers pixelated array 700 in FIG. 7).

According to certain embodiments, optical multiplexer 900 comprises a repeating pattern of optical elements (for example, refractive optical element 910 or optical element 800 of FIG. 8). In the non-limiting example of FIG. 9, the optical elements of optical multiplexer 900 have substantially optical properties determined by, for example, their width, cross section, and the index of refraction of the materials from which they are constructed).

In some embodiments, pixelated array 950 comprises an orthogonal grid of pixels (for example, pixel 951) of a color filter or OLED array which provides light at selected points of incidence on a flat side of optical multiplexer 900. According to various embodiments, both the optical elements of optical multiplexer 900 and the pixels of pixelated array 950 repeat at regular intervals to each other. In the illustrative example of FIG. 9, the pixel pattern repeats at four times the spatial frequency of the pattern of optical elements of optical multiplexer 900. Accordingly, each element of optical multiplexer 900 (for example, optical element 910) contacts four pixels of pixelated array 950 along an axis perpendicular to the grain of pixelated array 950.

As discussed with reference to FIG. 8, the point of incidence of light from a pixel relative to the cross section of an optical member of an optical multiplexer is, in certain embodiments, primarily determinative of the direction in which light from the pixel will be directed by the optical member. In the illustrative example of FIG. 9, the darkness of gradient shading within pixelated array 950 indicates the angle at which light is emitted from optical multiplexer 900. As shown in the example of FIG. 9, light exits optical multiplexer 900 across a range of angles between $\Theta_a$ (the leftmost emission angle, shown as the darkest shading gradient) and $\Theta_b$ (the rightmost emission angle, shown as the lightest shading gradient).

In certain embodiments, the regularity with which pixel pattern repeats relative to the pattern of optical elements of an optical multiplexer allows for the identification of groups of pixels associated with specific viewing angles or ranges of viewing angles. For example, light from the group of pixels comprising the lines of pixels marked "C" is emitted from optical multiplexer 900 across a range of angles which includes viewing angle $\Theta_2$, with viewers along viewing angle $\Theta_2$, primarily receiving light from the lines of pixels marked "C". Depending on, without limitation, the geometry of the optical elements of the optical multiplexer, the association between the light received at a particular viewing angle and specific groups (for example, lines) of pixels can be adjusted, variously producing strongly or subtly directional displays. Further, depending on, for example, the geometry of the elements of optical multiplexer and the resolution of pixelated array 950, the groups of pixels associated with a given direction may comprise multiple lines of pixels, as shown by callout 953, showing the association with viewing angle $\Theta_2$, relative to a pixelated array having sixteen times the resolution of pixelated array 950.

Figure 10:
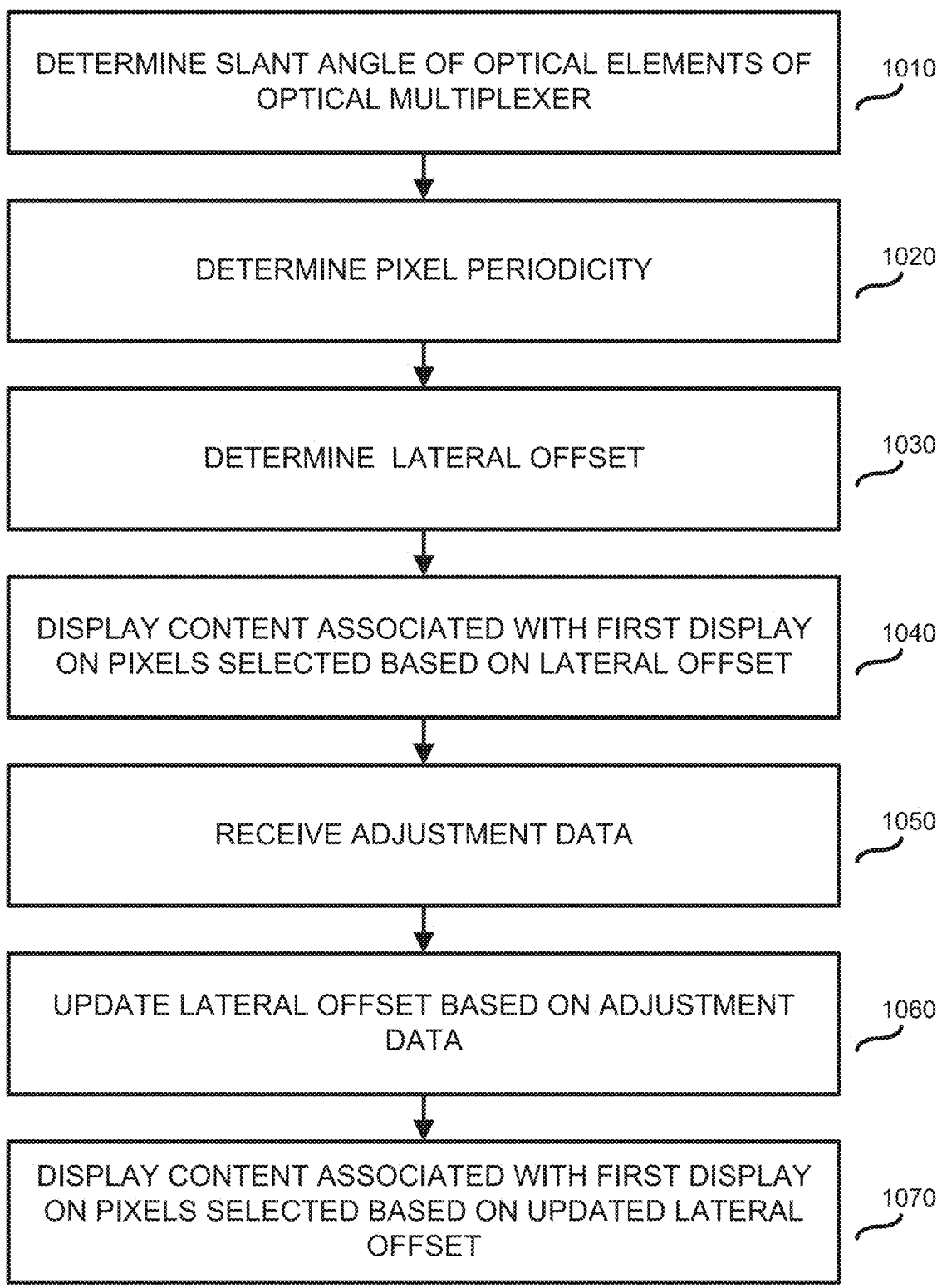
FIG. 10 illustrates a method for providing a multi-view display according to embodiments of this disclosure.

FIG. 10 illustrates operations of a method 1000 for providing a multi-view display according to some embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. According to various embodiments, method 1000 is practiced by the control logic (for example, multi-view pixel control logic 230 in FIG. 2) of a multi-view display apparatus (for example, multi-view display 105 in FIG. 1).

Referring to the non-limiting example of FIG. 10, at operation 1010, the multi-view display determines the slant angle (for example, slant angle 760 in FIG. 7) of the elements of the display's optical multiplexer (for example, lenses of a lenticular array or a slits of parallax barrier) relative to an axis of repetition of a pixel pattern of a pixelated array. In this way, the multi-view display can more accurately generate a mapping of each pixel's location relative to a cross section of the optical multiplexer at a point of incidence associated with light from the pixel. Put differently, in some embodiments, determining the slant angle helps the control logic of the multi-view display (for example, multi-view pixel control logic in FIG. 2) understand where a particular pixel is in relation to the curve of a lens on top of the pixel.

Depending on manufacturing tolerances and the operational parameters of the display (for example, desired image quality and available processing resources), in certain embodiments, the determination of the slant angle comprises retrieving a value of the slant angle from a memory of the multi-view display (for example, memory 225 in FIG. 2). In some embodiments, the slant angle is determined by a search, or iterative optimization process, whereby the multi-view display generates a plurality of directional displays, wherein each directional display is associated with a different slant angle value, and uses feedback from a sensor trained on the multi-view display (for example, calibration sensor 370) to determine which value provides the best image. In various embodiments (for example, embodiments with abundant processing resources), at operation 1010, the slant angle of the display be measured (for example, via a laser scan of the optical multiplexer) to determine the actual slant angle, as well as identifying regions in which the slant angle varies.

In certain embodiments, at operation 1020, the multi-view display determines the pixel periodicity. As used in this disclosure, the term "pixel periodicity" encompasses the spatial frequency between groups of pixels associated with a view angle or range of view angles. In certain embodiments, pixel periodicity depends on the distance between pixels which occupy a common location relative to a common section of an optical element of an optical multiplexer comprising a repeating pattern of optical elements. For example, in the explanatory example of FIG. 9, pixelated array is shown as having a periodicity of four pixels. Additionally, in certain embodiments according to this disclosure, pixel periodicity is also associated with the spacing of "guard regions" within a Boolean mask used in rendering content for a multi-view display. According to certain embodiments, pixel periodicity depends on a determined viewing distance for the directional display. For example, the viewing angle (relative to a reference axis) between a viewer and a point on the display varies across the display. As the viewer gets closer to the display, the variation in viewing angle across the display increases, necessitating adjustments in pixel periodicity.

At operation 1030, the multi-view display determines, based on the slant angle of the lens and the pixel periodicity, the lateral offset of at least one directional display to be provided by the multi-view display. As used in this disclosure, the term "lateral offset" encompasses, for a multi-view display having a generally vertically oriented optical multiplexer (for example, a lenticular array whose optical elements run substantially up and down the face of the display with a slight slant angle to mitigate color banding) a lateral (e.g., along a line of pixels running across the grain of the optical multiplexer), distance between where a given pixel would be rendered in the absence of the optical multiplexer, and where the pixel is rendered in a multi-view display to support a desired directional display. In various embodiments, the directionality of the directional display can be adjusted (for example, changing the angle of the directional display to follow the movements of a tracked user) through adjustments to a lateral offset.

As shown in the illustrative example of FIG. 10, at operation 1040, the multi-view display displays content associated with a first directional display (for example, first directional display 125a in FIG. 1) using pixels of a pixelated array selected based on the lens offset determined at operation 1030.

In various embodiments, at operation 1050, the multi-view display receives adjustment data. In certain embodiments, adjustment data comprises user tracking data (provided by, for example, user tracking system 235 in FIG. 2) indicating that a tracked viewer has moved to a location associated with a different viewing angle. In various embodiments, adjustment data comprises feedback (for example, feedback based on data collected by calibration sensor 370 in FIG. 3) regarding a parameter of a directional display. For example, the adjustment data may be data showing that a directional display is not being displayed at the correct viewing angle, or data indicating the presence of "ghosting" or other unwanted visual effects. In certain embodiments, adjustment data may be provided via a user interface (for example, user interface 215 in FIG. 2). As a non-limiting example, in certain embodiments, where a user interface is provided via a remote control, the remote control may include a "recalibrate" button, by which a user can signal to the multi-view display that a directional display does not appear correct.

In some embodiments according to this disclosure, at operation 1060, the multi-view display updates one or more lateral offset values based on the receipt of adjustment data at operation 1060, and at operation 1070 displays content associated with the first directional display based on the updated lateral offset(s).

Figure 11:
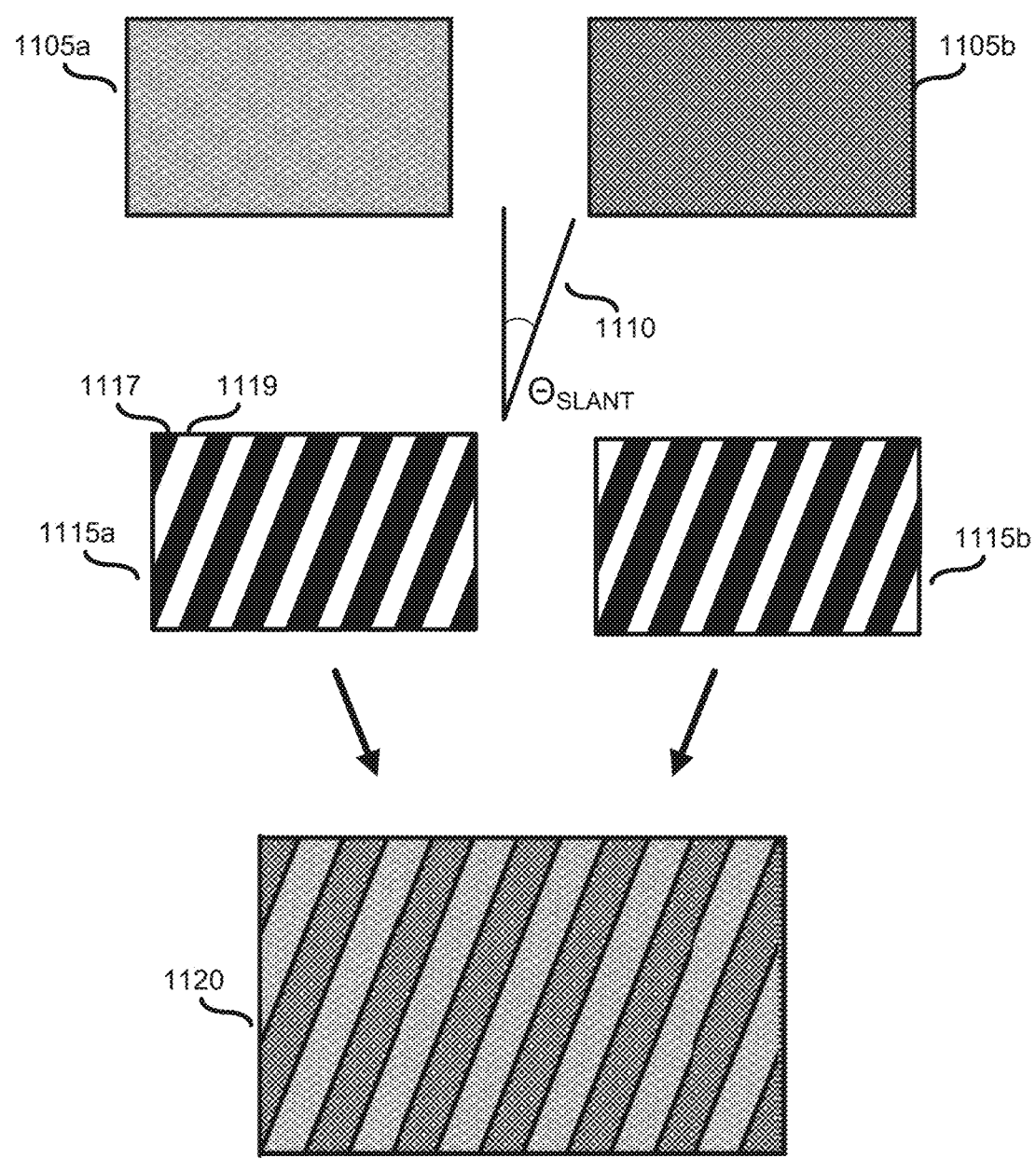
FIG. 11 illustrates aspects of rendering a multi-view display according to embodiments of this disclosure.

FIG. 11 illustrates aspects of rendering a multi-view display according to various embodiments of this disclosure. The embodiment of the multi-view display shown in FIG. 11 is for illustration only and other embodiments could be used without departing from the scope of the present disclosure.

In the non-limiting example of FIG. 11, a multi-view display composed of a first directional display (for example, first directional display 125a in FIG. 1) and a second directional display (for example, second directional display 125b in FIG. 1) is constructed from first content 1105a and second content 1105b. Put differently, the example of FIG. 11 illustrates aspects of providing a display functionality akin to the "two view" display described with reference to FIG. 1 of this disclosure.

In this illustrative example, both first content 1105a and second content 1105b are initially represented as they would appear when rendered for a single view display—as utilizing all of the available pixels of a rectangular region of a pixelated array (for example, part or all of the available display of a television or flat screen monitor). In certain embodiments, first content 1105a and second content 1105b are rendered to provide first and second directional displays on a multi-view display (for example, multi-view display 105 in FIG. 1) comprising an optical multiplexer (for example, a lenticular array or parallax barrier) whose optical elements are angled away from a line of repetition of a pixelated array of the multi-view display at a slant angle 1110.

According to certain embodiments, first content 1105a is rendered to be displayed as a first directional display provided by the multi-view display using a first mask, such as a Boolean mask (also referred to herein as a "Boolean view map") 1115a. Similarly, second content 1105b is rendered to be displayed as a second directional display by the multi-view display using second mask 1115b, such as a second Boolean mask. In various embodiments according to this disclosure, first and second (for example, Boolean) masks 1115a and 1115b split all or a contiguous subset of the pixels of a pixelated array (for example, color filter 310 in FIG. 2) into a defined set of excluded pixels and a defined set of active pixels. As shown in first mask 1115a, the set of excluded pixels 1117 (shown in black) comprises one or more regions of the pixelated array that will not be used to render first content 1105a as a first directional display. According to various embodiments, the pixels comprising set of excluded pixels 1117 are reserved for one or more of rendering second content 1105b as a second directional display, providing guard regions, or rendering additional content for additional directional displays.

According to various embodiments, and as shown in first mask 1115a, the set of active pixels 1119 (shown in white) comprises one or more regions of the pixelated array used to render first content 1105a as a first directional display. According to various embodiments, the set of active pixels 1119 is determined based on, at a minimum, slant angle 1110 of the optical multiplexer, a desired directionality for the first directional display, and a spacing associated with the pitch, or spacing between elements, of the optical elements of the optical multiplexer. Additionally, the set of active pixels 1119 is, in some embodiments, determined based on known optical effects (for example, cross-talk between adjacent optical elements) of the optical multiplexer. As shown in the illustrative example of FIG. 11, the set of active pixels 1119 comprises regions of a pixelated array parallel to slant angle 1110.

According to various embodiments, a second mask 1115b (for example, a Boolean mask), comprising a set of excluded pixels and a set of active pixels determined according to similar parameters as set of active pixels 1119, as applied to a second directional view based on second content.

According to various embodiments, the pixels of the pixelated array are controlled based on first mask 1115a and second mask 1115b as shown in the map of rendered pixels 1120. While the non-limiting example of FIG. 11 explains providing two or more directional displays using Boolean masks, embodiments according to the present disclosure are not so limited, and masks utilizing weighted or other non-binary apportionment of image data to pixels are possible and within the contemplated scope of this disclosure.

Figure 12:
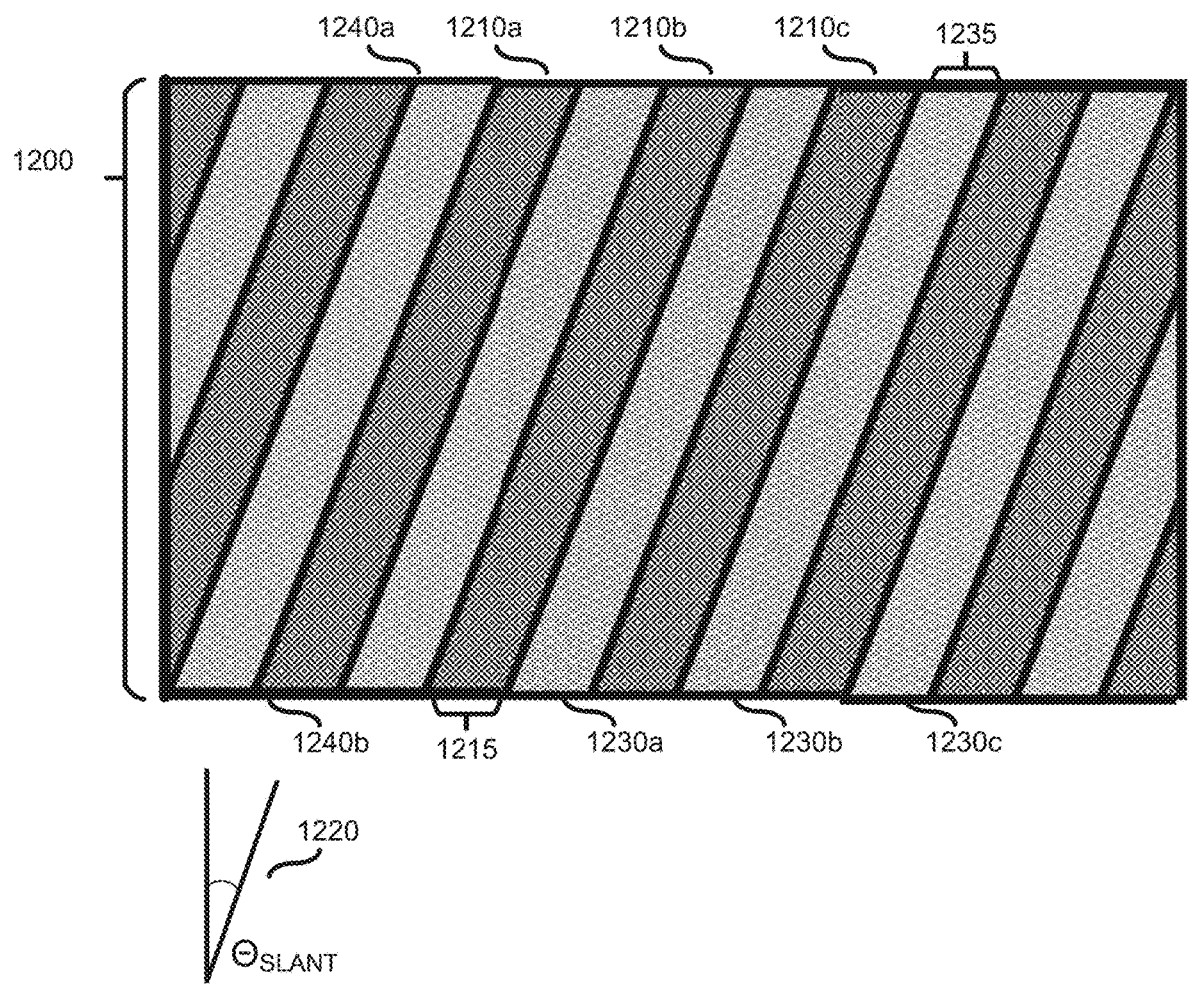
FIG. 12 illustrates aspects of a map of rendered pixels of a pixelated array for a multi-view display according to embodiments of this disclosure.

FIG. 12 illustrates aspects of a map of rendered pixels of a pixelated array 1200 for a multi-view display according to various embodiments of this disclosure. The embodiment of the pixelated array 1200 shown in FIG. 12 is for illustration only and other embodiments could be used without departing from the scope of the present disclosure.

Referring to the non-limiting example of FIG. 12, regions of a pixelated array (for example, color filter 310 in FIG. 3 or an OLED array) associated with the superposition of a first mask (for example, first mask 1115a in FIG. 11) associated with a first directional display and a second mask (for example, second Boolean mask 1115b in FIG. 11) associated with a second directional display to be provided by a multi-view display (for example, multi-view display 200 in FIG. 2).

As shown in the non-limiting example of FIG. 12, pixelated array 1200 includes a plurality of regions (including regions 1210a, 1210b, and 1210c) associated with a first directional display of first content. In some embodiments, each of regions 1210a, 1210b and 1210c has at least one boundary which is substantially parallel to a slant angle 1220 of an optical multiplexer placed on top of pixelated array 1200. According to various embodiments, each of regions 1210a, 1210b and 1210c has a predetermined lateral offset and a width 1215 corresponding to a predetermined fraction of the pitch of the optical elements of the optical multiplexer. Depending on viewing parameters, including, without limitation, the desired range of viewing angles associated with the first directional display, and an intended viewing distance of the first directional display, width 1215 has, in certain embodiments a width of a subpixel or more.

Further, in certain embodiments, for example, embodiments where a directional display is being provided to a viewer at a short viewing distance, width 1215 may vary across the horizontal axis of pixelated array 1200. Similarly, given the discrete nature of pixelated array 1200 (i.e., width 1215 is, in certain embodiments, expressed in increments of pixels and/or subpixels), width 1215 can be zero.

According to the non-limiting example of FIG. 12, pixelated array 1200 includes a plurality of regions (including regions 1230a, 1230b, and 1230c) associated with a second directional display of second content. In some embodiments, each of regions 1230a, 1230b and 1230c has at least one boundary which is substantially parallel to a slant angle 1220 of an optical multiplexer placed on top of pixelated array 1200. According to various embodiments, each of regions 1230a, 1230b and 1230c has a predetermined lateral offset and a width 1235 corresponding to a predetermined fraction of the pitch of the optical elements of the optical multiplexer. As discussed above with respect to width 1215, in certain embodiments, width 1235 comprises a number of subpixels and/or pixels. Similarly, width 1235 can, in some embodiments, vary along the horizontal axis of pixelated array 1200, with values of zero being possible due to the discrete nature of the increments for expressing width 1235.

Additionally, in the non-limiting example of FIG. 12, the rendered pixels of pixelated array 1200 include a plurality of guard regions (including first guard region 1240a and second guard region 1240b) along the boundaries between regions of pixels associated with the first directional display and regions of pixels associated with the second directional display provided by the multi-view display. In this non-limiting example, the plurality of guard regions comprises lines of pixels which are excluded pixels in a pair of superimposed Boolean masks. According to various embodiments, the pixels in the guard regions are turned off, to minimize cross-talk, ghosting and other unwanted optical effects which can arise, for example, in the areas where directional views meet. As will be discussed elsewhere herein, implementing blacked out guard regions comprises one of a plurality of possible methods for managing and mitigating unwanted visual effects in, for example, the areas of adjacency between sets of pixels associated with directional displays. Examples of alternatives to blacking out guard regions (for example, guard regions 1240a and 1240b) include, without limitation, dimming pixels presenting large color or brightness contrasts (which are especially prone to producing ghosting effects), or replacing pixel colors with colors common to both directional displays. The above-described alternatives to blacking out guard regions are, in certain embodiments, performed within the regions defined as guard regions.

Figure 13:
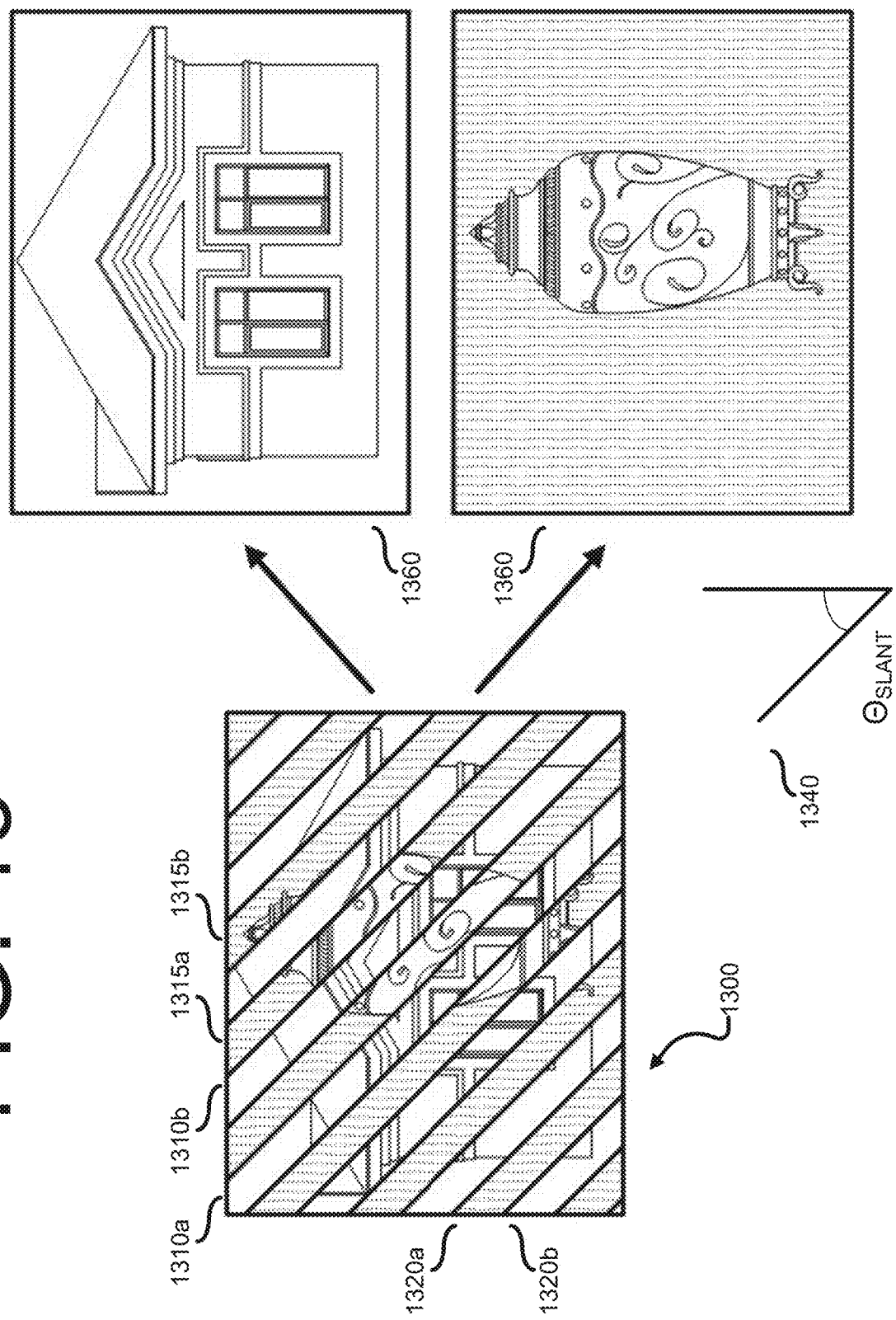
FIG. 13 illustrates aspects of rendering pixels for a multi-view display according to embodiments of this disclosure.

FIG. 13 illustrates aspects of rendering pixels for a multi-view display according to some embodiments of this disclosure. The embodiment of the multi-view display shown in FIG. 13 is for illustration only and other embodiments could be used without departing from the scope of the present disclosure.

Referring to the non-limiting example of FIG. 13, a representation of a pixelated array 1300 of a multi-view display (for example, multi-view display 105 of FIG. 1) with pixels rendered to provide first and second directional displays is shown. According to various embodiments, pixelated array 1300 comprises regions of pixels (including regions 1310a and 1310b) comprising pixels rendered to provide a first directional display 1350 associated with first content (in this example, an image of a house). In some embodiments, pixelated array 1300 further comprises regions of pixels (including regions 1315*a* and 1315*b*) comprising pixels which have been rendered to provide a second directional display 1360 associated with second content (in this illustrative example, an image of an urn). Further, in some embodiments, pixelated array 1300 includes a plurality of blacked out guard regions (including guard regions 1320*a* and 1320*b*) associated with regions of pixelated array 1300 under lines of adjacency between optical elements of an optical multiplexer oriented at a slant angle 1340.

Figure 14:
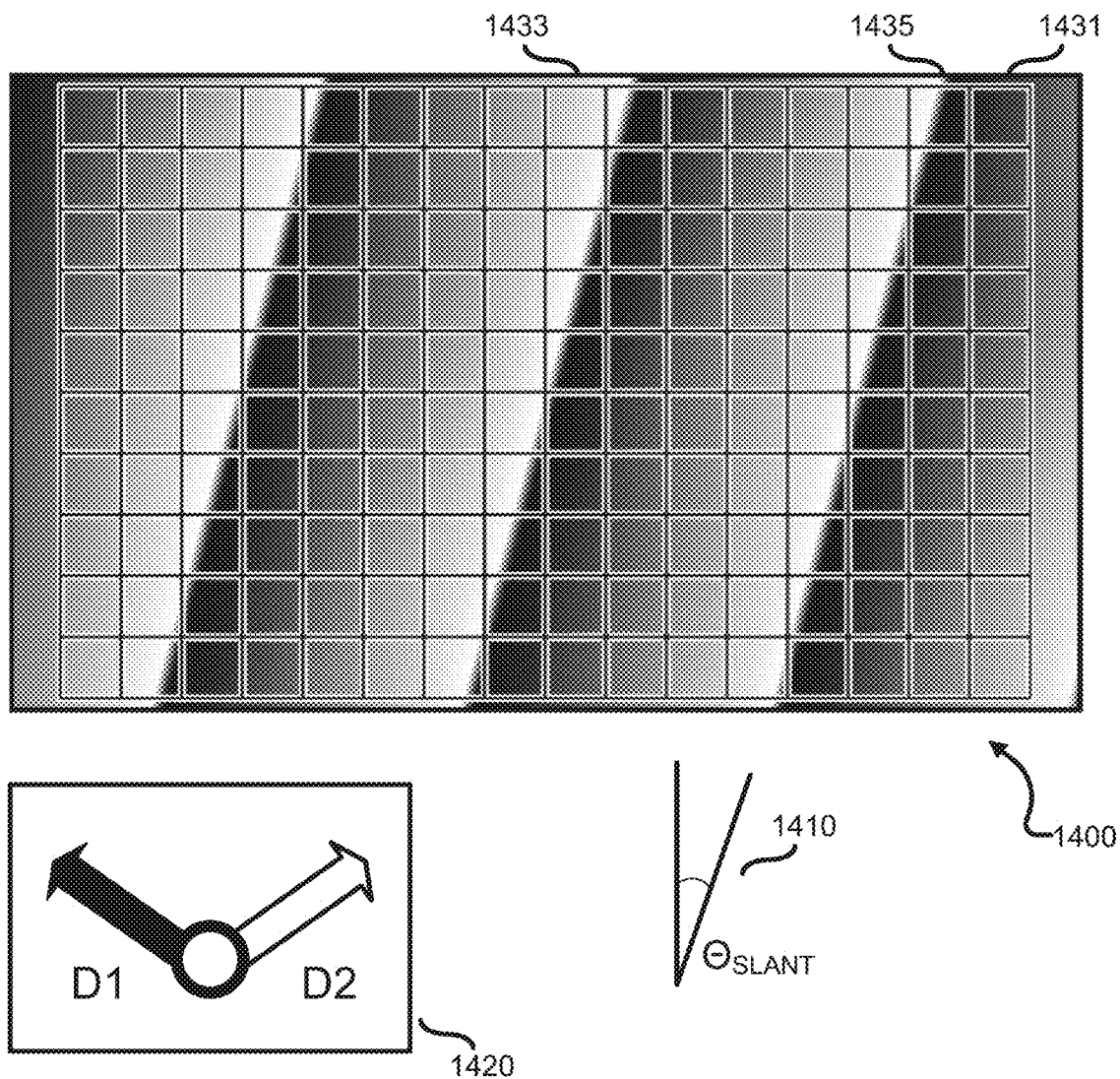
FIG. 14 illustrates aspects of generating a mask according to embodiments of this disclosure.

FIG. 14 illustrates aspects of generating a Boolean mask according to certain embodiments of this disclosure. The embodiment of the Boolean mask shown in FIG. 14 is for illustration only and other embodiments could be used without departing from the scope of the present disclosure.

Referring to the non-limiting example of FIG. 14, a pixelated array 1400 (for example, a color filter or an OLED array) is shown. In this illustrative example, pixelated array is part of a multi-view display and is positioned in contact, or close proximity to an optical multiplexer (for example, a lenticular array or actuated parallax barrier). According to certain embodiments, the optical elements of the optical multiplexer are disposed at a slant angle 1410 relative to a direction of repetition of the pixels of pixelated array 1400.

In the illustrative example of FIG. 14, the shading of the pixels of pixelated array 1400 indicates the directionality of light exiting the optical multiplexer relative to the point of incidence. Specifically, as shown by legend 1420, regions shown with dark shading (for example, first pixel 1431) are strongly associated with light traveling from the optical multiplexer in a first viewing direction ("D1"). Similarly, regions of pixelated array 1400 shown with little or no shading (for example, second pixel 1433) are strongly associated with light traveling from the optical multiplexer in a second viewing direction ("D2"). Further, certain regions of pixelated array 1400 comprise portions (for example, third pixel 1435) strongly associated with light traveling from the optical multiplexer in both the first and second viewing directions.

Figure 15:
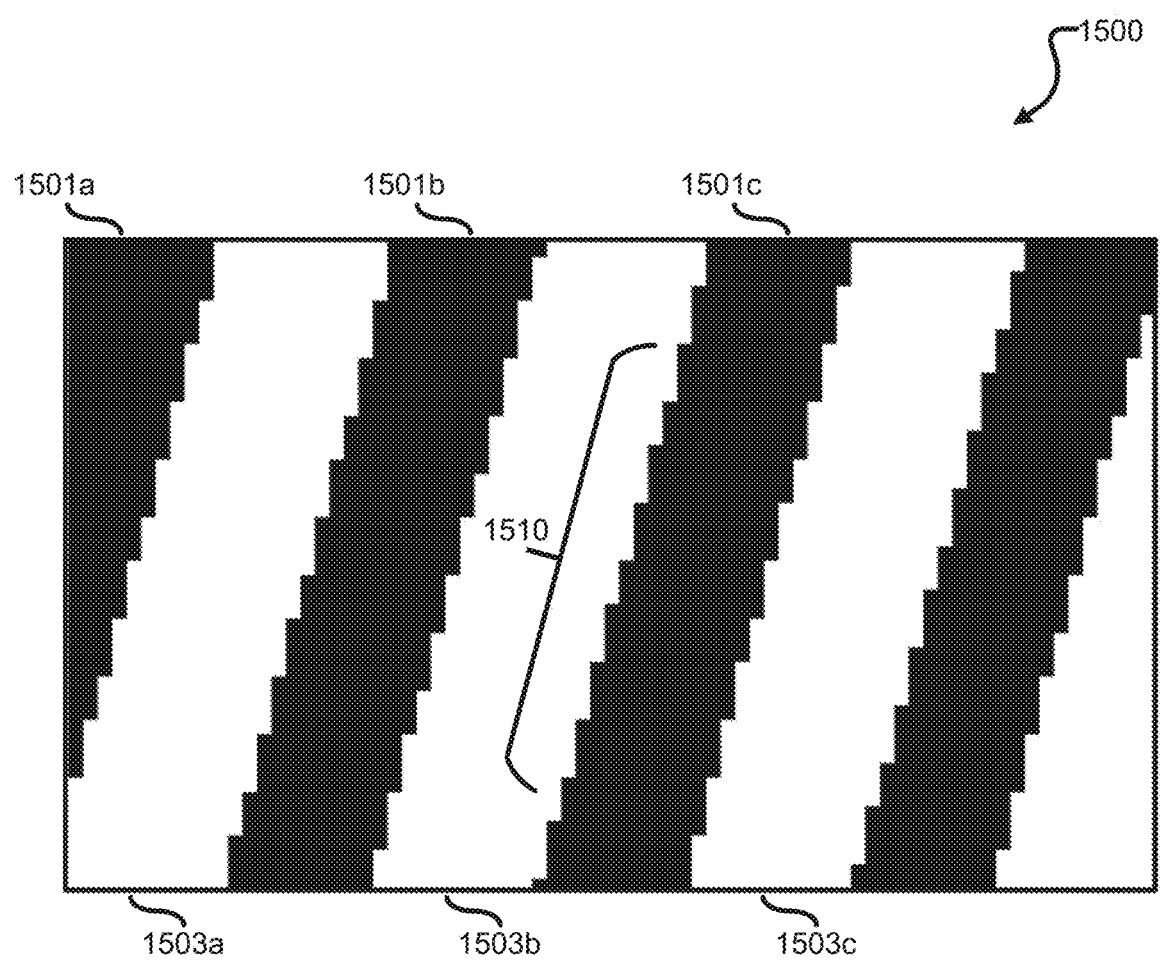
FIG. 15 illustrates an example of a mask according to embodiments of this disclosure.

FIG. 15 illustrates an example of a Boolean mask 1500 according to some embodiments of this disclosure. The embodiment of the Boolean mask 1500 shown in FIG. 15 is for illustration only and other embodiments could be used without departing from the scope of the present disclosure.

Referring to the non-limiting example of FIG. 15, a Boolean mask 1500 is shown. In this example, the Boolean mask 1500 comprises a Boolean mask for rendering content on the pixelated array 1400 of FIG. 14 to provide a directional display associated viewing direction "D2" of FIG. 14.

As shown in FIG. 15, regions of pixelated array 1400 that, due to the placement, slant angle and periodicity of the optical multiplexer, are strongly associated with viewing direction "D1" are assigned to a set of excluded pixels of Boolean mask 1500, the set of excluded pixels including region 1501*a*, region 1501*b* and region 1501*c*. Similarly, regions of pixelated array 1400 that, due to the placement, slant angle and periodicity of the optical multiplexer, are strongly associated with viewing direction "D2" are assigned to a set of active pixels of Boolean mask 1500, the set of active pixels including region 1501*a*, region 1501*b* and region 1501*c*. According to certain embodiments, the filter value (for example, embodiments where pixelated array 1400 is a color filter) or emission value (for example, an OLED array), of the pixels within the set of active pixels are controlled based on a rendering of content to be provided in a directional display and determined lateral offsets. Similarly, in certain embodiments using reflective display technologies (for example, e-ink), the filter value corresponds to a controlled value of a light absorbing material (for example, a controlled distribution of black and white particles in a pixel).

According to certain embodiments, the assignment of pixels to the set of excluded pixels and is based on a binary determination of whether a pixel (for example, third pixel 1435 in FIG. 14) is more associated with viewing direction "D1" or viewing direction "D2." In some embodiments, this binary assignment of pixels to the set of excluded pixels and set of active pixels produces a "saw tooth" pattern 1510 along the boundaries between regions of active pixels and regions of excluded pixels. Depending on the application and the resolution of the display, "saw tooth" pattern 1510 can be an immaterial byproduct of a computationally efficient way of generating a Boolean mask, or undesirable. For example, in certain gaming applications (for example, a two player game where each player is provided with her own directional display), the simplicity of a binary assignment of pixels to either the set of excluded pixels or active pixels is computationally inexpensive and frees up processing resources for other processes. Further in certain gaming applications, the gameplay may be sufficiently fast paced, and the content of each directional display so busy, that users are more likely to perceive lags in frame rate than ghosting or other visual artifacts. In other applications, (for example, photo editing, or watching high-definition video) where resolution and clarity of image are an equal or greater priority than frame rate, jagged transitions between regions of active and excluded pixels can produce abrupt changes in chroma and/or contrast, which, depending on their location relative to a cross section of the elements of the optical multiplexer, can create unwanted optical effects, such as cross-talk and ghosting. Additionally, in some applications, for example, a multi-player game with player-proprietary content (for example, a hand of cards, or a tray of letters), precisely directing a directional display at only one viewer (e.g., to keep players from looking at each other's cards or letters) may be more important to the quality of gameplay than lower frame rates. Accordingly, in such embodiments, the additional computational overhead associated with certain, more nuanced masking techniques may be fully appropriate.

Figure 16:
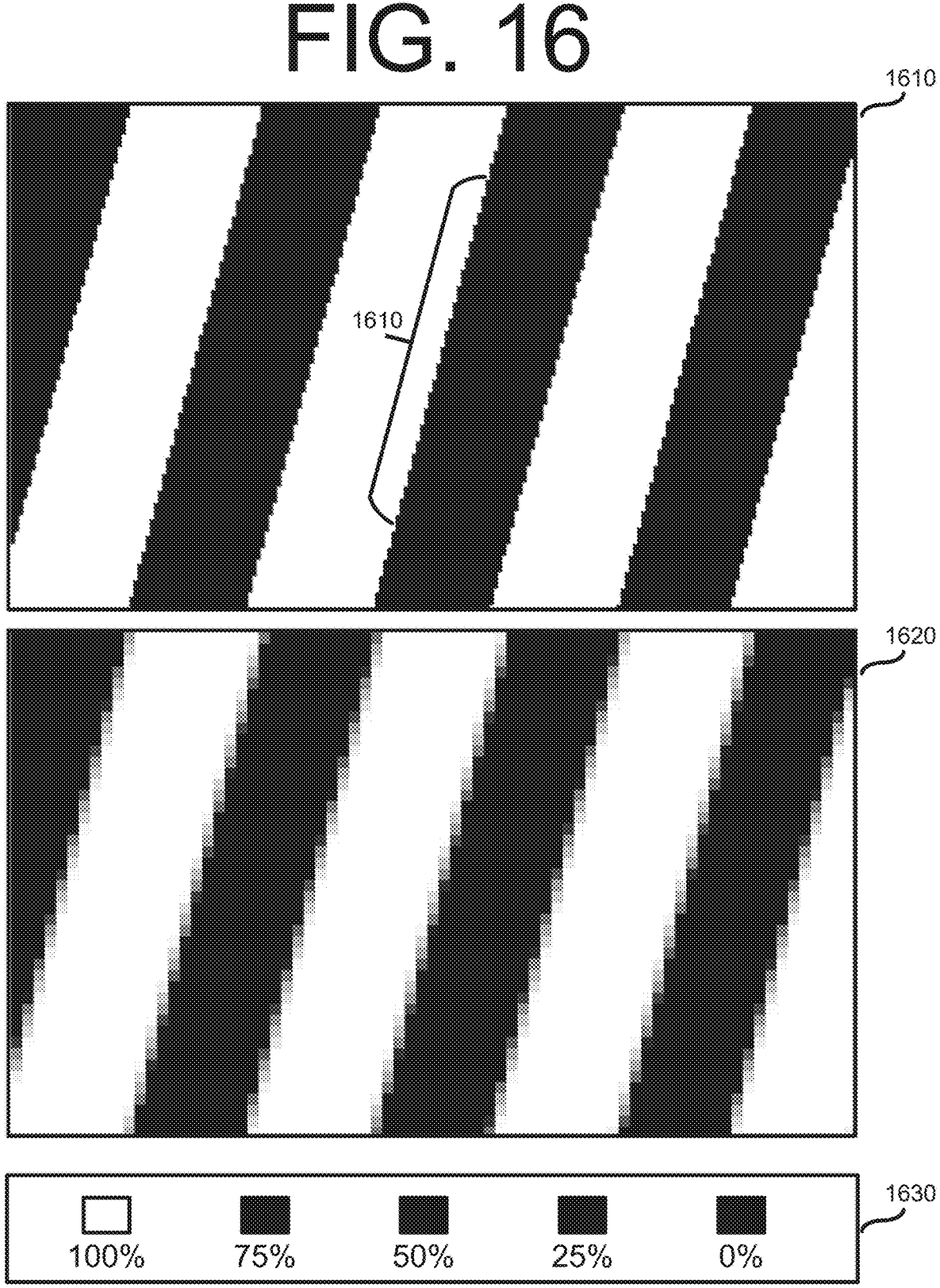
FIG. 16 illustrates aspects for generating a mask according to embodiments of this disclosure.

FIG. 16 illustrates aspects of generating a weighted mask according to various embodiments of this disclosure. The embodiment of the weighted mask shown in FIG. 16 is for illustration only and other embodiments could be used without departing from the scope of the present disclosure. As discussed with reference to the non-limiting example of FIG. 15, while a binary assignment of pixels to either a set of active pixels or a set of excluded pixels of a Boolean mask is computationally inexpensive and well-suited for certain applications (for example, gaming applications), it can be inappropriate for other applications, as "mixed" pixels which comprise regions divided between being strongly associated with divergent viewing directions produce jagged boundaries between sets of active and excluded pixels.

According to certain embodiments, the boundaries between regions of active and excluded pixels of a Boolean mask can be softened or smoothed out by applying a two-step process to generate a weighted mask. According to the first step of the process, a high-resolution Boolean mask 1610 is generated, wherein a binary determination of regions under an optical multiplexer as belonging to either the set of active pixels or excluded pixels is performed at a resolution that is higher than the actual resolution of the pixelated display. In the non-limiting example of FIG. 16, high resolution Boolean mask 1610 is generated at four (4×) the resolution of pixelated array 1400. As shown in the illustrative example of FIG. 16, the boundaries between regions of active and excluded pixels produce a "saw tooth" pattern 1615, which has smaller discontinuities (or finer "teeth") than the "saw tooth" pattern 1510 in FIG. 15.

According to various embodiments, in the second step, high-resolution Boolean mask 1610 is scaled down to the resolution of pixelated array 1400. For "mixed" pixels (for example, third pixel 1435 in FIG. 14) a rendering weighting value is determined from high resolution Boolean mask 1610. For each "mixed" pixel the rendering weighting value is based on the relative numbers of "pixels" of Boolean mask 1610 belonging to the set of excluded and active pixels. For example, if, in high resolution Boolean mask 1610, the region covered by pixel 1435 comprises three high resolution "pixels" determined to belong to a set of excluded pixels and one high resolution "pixel" determined to belong to a set of active pixels, pixel 1435 is assigned a rendering weighting value of 25%, meaning that a filter value of pixel 1435 is 25% dependent on the contribution for a directional display associated with direction "D2." In this way, pixels along the boundaries of optical elements of an optical multiplexer are rendered based on a weighted blending of the viewing directions with which they are associated, and a weighted mask 1620 is generated.

Weighted mask 1620, in conjunction with legend 1630, illustrates an example of a mask where the transitions between regions of active pixels and excluded pixels are softened (as compared to a Boolean mask) based on the application rendering weighting values to "mixed" pixels (such as, third pixel 1435 in FIG. 14). In some embodiments, the boundaries between regions of active and excluded pixels of a mask can be softened or smoothed out by applying an anti-aliasing process.

Figure 17:
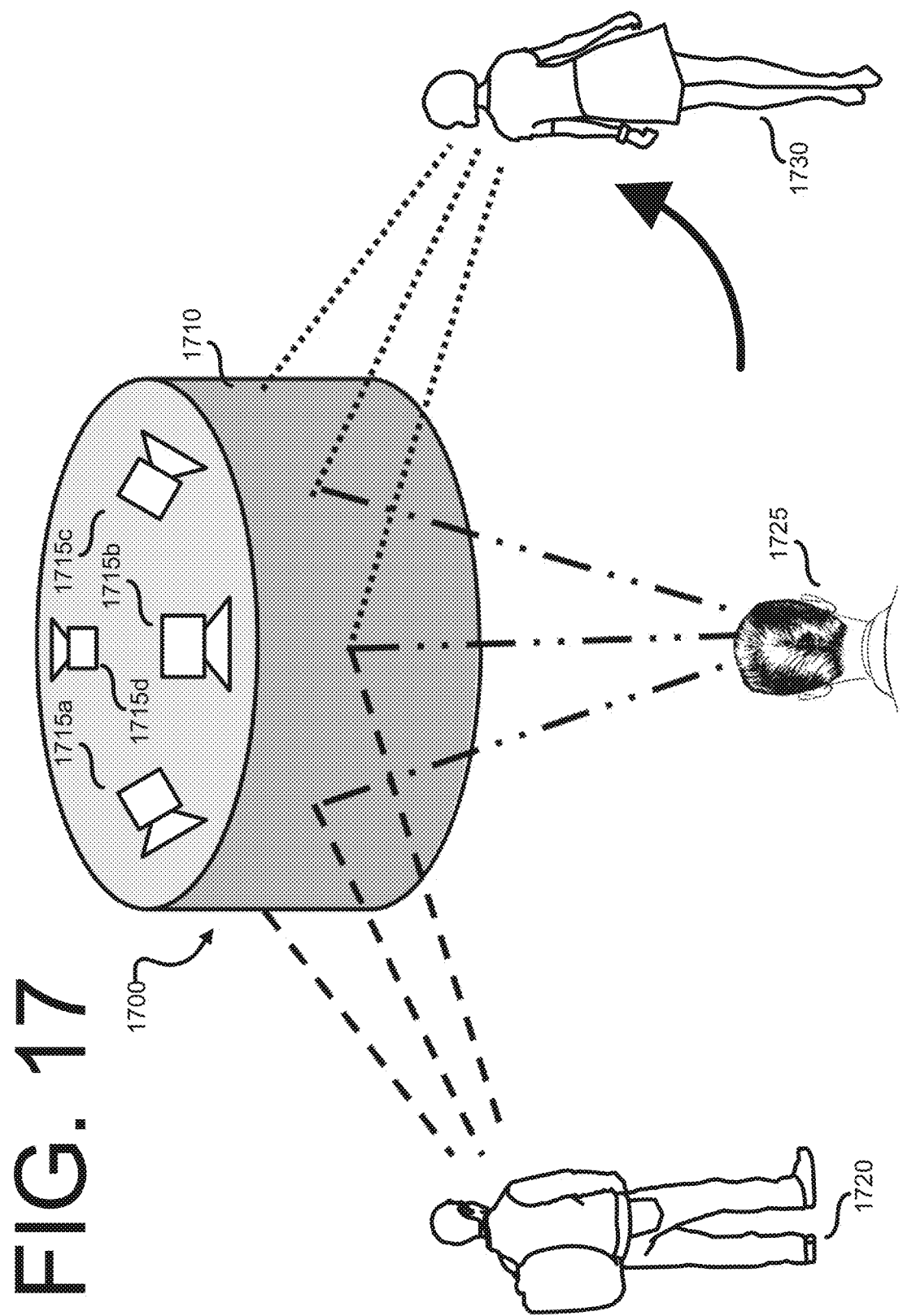
FIG. 17 illustrates an example of a cylindrical, user-tracking multi-view display according to embodiments of this disclosure.

FIG. 17 illustrates an example of a cylindrical, user-tracking multi-view display according to certain embodiments of this disclosure. The embodiment of the multi-view display shown in FIG. 17 is for illustration only and other embodiments could be used without departing from the scope of the present disclosure.

Referring to the non-limiting example of FIG. 17, a cylindrical, user-tracking multi-view display 1700 is shown. According to various embodiments, user-tracking multi-view display 1700 comprises one or more curved display panels 1710 comprising a curved array of pixels disposed beneath a curved optical multiplexer, the optical elements of which repeat along the circumference of multi-view display 1700. Additionally, according to various embodiments, multi-view display 1700 comprises a plurality of field sensors (for example, field sensor 360 in FIG. 3), including field sensors 1715*a*, 1715*b*, 1715*c* and 1715*d*. In certain embodiments, field sensors 1715*a* through 1715*d* identify and track the movement of viewers (for example, first male viewer 1720, second male viewer 1725 and first female viewer 1730) relative to multi-view display 1700. According to certain embodiments, multi-view display 1700 performs facial recognition of viewers based on data obtained from field sensors 1715*a* through 1715*d* and presents, for each identified viewer, a directional display selected for that person. According to some embodiments, multi-view display 1700 does not perform facial recognition (for example, due to privacy concerns), but rather, recognizes and associates unique features to each viewer to facilitate tracking. For example, in one embodiment, multi-view device identifies first male viewer 1720 as a "male with backpack" or first female viewer 1730 as a "female with yellow shirt." As shown in the non-limiting example of FIG. 17, multi-view display 1700 tracks the position of each of viewers 1720, 1725 and 1730 and generates a mask (for example, a weighted mask or a Boolean mask) associated with a directional display to provide a unique directional display to each viewer. As viewers move relative to multi-view display 1700, the display recalculates the mask for each viewer's directional display, and adjusts parameters (for example, lateral offset) to make the directional display follow the moving viewer. In some embodiments, as an alternative to tracking viewers, multi-view display 1700 could direct directional displays to predefined viewing regions. For example, viewers facing a north side of multi-view display 1700 could be presented with content regarding attractions to the south.

FIG. 18 illustrates an example of operations of a method 1800 for providing a multi-view display according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. According to certain embodiments, method 1800 is practiced at a multi-view display apparatus (for example, multi-view display 105 in FIG. 1, multi-view display 200 in FIG. 2, or multi-view display 300 in FIG. 3).

According to certain embodiments, at operation 1810, a multi-view display, or pixel-level control logic for a multi-view display (for example, multi-view pixel control logic 230 in FIG. 2) assigns a first display (for example, first directional display 1350 in FIG. 13) to a pixel (for example, pixel 1431 in FIG. 14) associated with a first viewing angle relative to a first axis (for example, third axis 115 in FIG. 1). According to certain embodiments, the assignment of a first display, or directional display, to the pixel at operation 1810 is performed by generating a mask (for example, first mask 1115*a* in FIG. 11) for the first directional display.

As shown in the non-limiting example of FIG. 18, at operation 1815, the multi-view display assigns a second display (for example, second directional display 1360 in FIG. 13) to a pixel (for example, pixel 1433 in FIG. 14) associated with a second viewing angle relative to a first axis (for example, third axis 115 in FIG. 1). According to certain embodiments, the assignment of a second display, or second directional display, to the pixel at operation 1820 is performed by generating a mask (for example, second mask 1115*b* in FIG. 11) for the second directional display.

In certain embodiments according to this disclosure, at operation 1820, the multi-view display controls a filter value (or equivalently, an emission value of an OLED element) for the first pixel based on a rendering of the first content for display as part of the first directional display. According to certain embodiments, the first content is rendered for display on a set of active pixels (for example, the set of active pixels including regions 1503*a*, 1503*b*, and 1503*c* in FIG. 15) of a mask for the first directional display. According to certain embodiments, the rendering of first content for display in a first directional display comprises determining, for each rendered pixel, a lateral offset associated with a selected directionality for the first directional display.

According to various embodiments, at operation 1825, the multi-view display controls a filter value (or equivalently, an emission value of an OLED element) for the second pixel based on a rendering of the second content for display as part of the second directional display. According to certain embodiments, the second content is rendered for display on a set of active pixels (for example, the set of active pixels in second mask 1115*b* in FIG. 11) of a mask for the second directional display. According to certain embodiments, the rendering of second content for display in a second directional display comprises determining, for each rendered pixel, a lateral offset associated with a selected directionality for the second directional display.

Figure 19A:
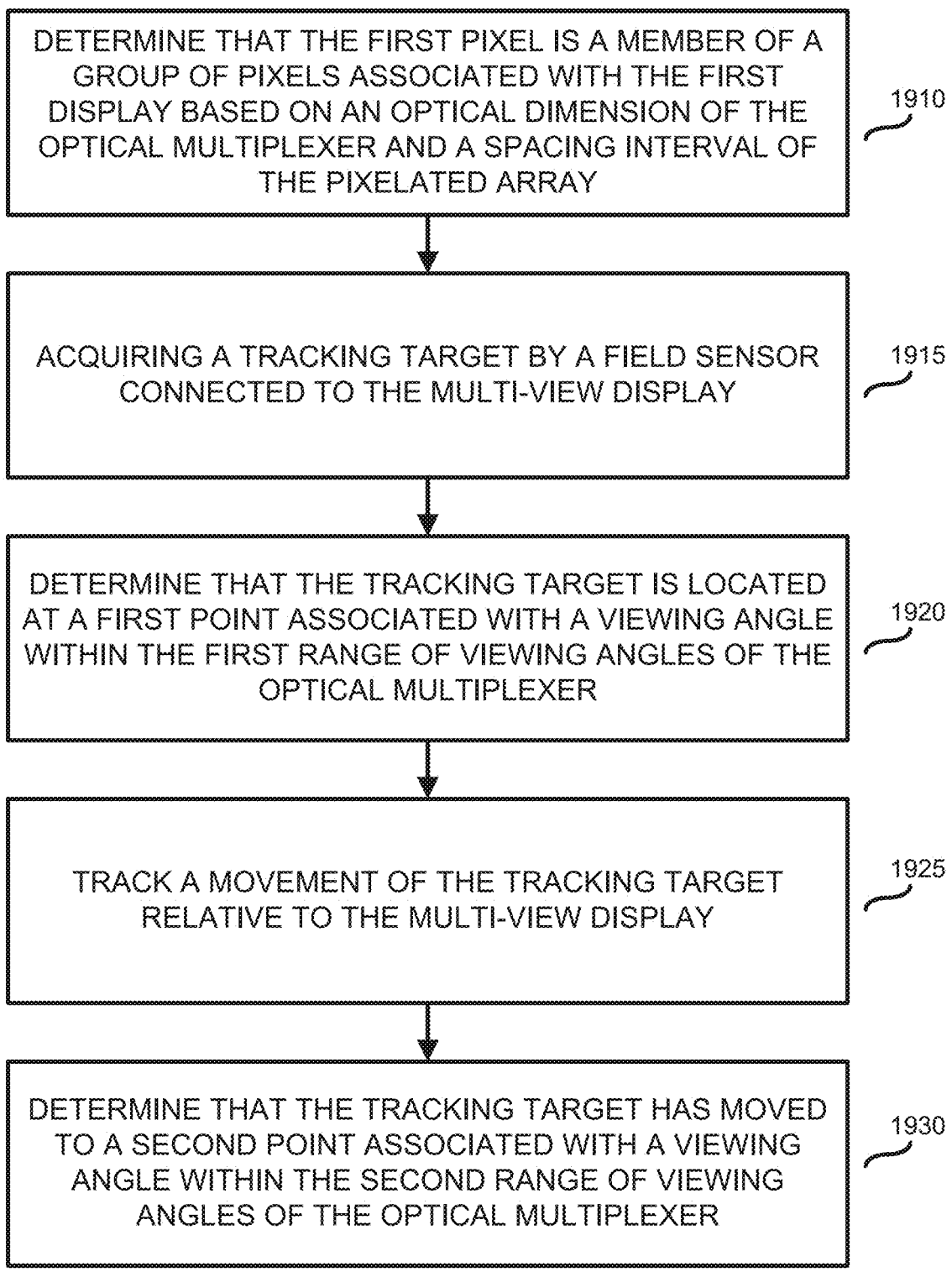

FIG. 19A illustrates an example of operations of a method for providing a multi-view display, according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. In some embodiments, the operations described with reference to FIG. 19A are performed in addition to, or as alternatives to the operations of the example of a method 1800 described with reference to FIG. 18 of this disclosure. According to certain embodiments, method 1800 is practiced at a multi-view display apparatus (for example, multi-view display 105 in FIG. 1, multi-view display 200 in FIG. 2, or multi-view display 300 in FIG. 3).

Referring to the non-limiting example of FIG. 19A, at operation 1910, a multi-view display (for example, multi-view display apparatus (for example, multi-view display 1700 in FIG. 17) determines that a first pixel of a pixelated array of the multi-view display (for example, first pixel 1431 in FIG. 14) is associated with a first group of pixels (for example, a set of pixels in an active group of pixels of a Boolean mask, or a group of pixels sharing a common position relative to a cross section of an optical multiplexer, such as the groups of pixels designated "A," "B," "C," and "D" in FIG. 9). According to certain embodiments, the group of pixels is defined based on an optical dimension of an optical multiplexer. In certain embodiments, the optical dimension is a lens pitch, or spacing between other types of optical elements of the optical multiplexer. In various elements, the optical dimension is a local cross section (e.g., the cross section of an optical element above the pixel). Further examples of optical dimensions of an optical multiplexer include, without limitation, the slant angle of a lenticular array or parallax barrier, the magnification or index of refraction of a lenticular optical multiplexer, a periodicity value (for example, a lens pitch) relative to the periodicity and arrangement of pixels and/or subpixels, and a desired viewing distance.

As shown in the explanatory example of FIG. 19A, at operation 1915, the multi-view display, or a component of the control logic for a multi-view display (for example, user tracking system 235 in FIG. 2), acquires a tracking target (for example, second viewer 130 in FIG. 1) based on data received by one or more field sensors (for example, field sensors 1715*a* through 1715*d* in FIG. 17). In some embodiments, the field sensors are separate components, which are connected to the multi-view display. In certain embodiments, the field sensors are part of the apparatus providing the multi-view display.

In some embodiments according to this disclosure, at operation 1920, the multi-view display determines that the tracking target acquired at operation 1915 is located at a first point, based on a mapping of viewing angles to pixels behind an optical multiplexer (for example, a mapping generated by determining a lateral offset by operations of method 1000 of FIG. 10). According to some embodiments, the multi-view display further determines that the first point is associated with a viewing angle in a first range of viewing angles to which the optical multiplexer can direct directional displays.

According to various embodiments, at operation 1925, the multi-view display tracks the movement of the tracking target acquired at operation 1915, and positioned at 1920. In some embodiments according to this disclosure, the multi-view display tracks the movement of the tracking target along a coordinate axis associated with the directionality of a directional display (for example, multi-view display 1700 in FIG. 17 may track the motion of first female viewer 1730 as an angle relative to a multi-view display 1700, so that multi-view display 1700 can, as necessary, adjust the lateral offset of the pixels used to provide her directional display). According to some embodiments, the multi-view tracks movements of the tracking target in addition to, or instead of, the viewer's viewing angle relative to the display. As one example, in certain embodiments, at operation 1925, the multi-view display tracks movements along other axes, for example, along a radial axis, to determine how close or far the tracked target is from the display. In certain embodiments, tracking the viewing distance of a viewer can enhance the image quality of directional displays, for example, by providing data to account for parallax effects associated with a binocular viewer moving closer or further away from a screen.

Referring to the non-limiting example of FIG. 19A, at operation 1930, the multi-view device determines that the tracking target has moved outside of the range of viewing angles associated with the first directional display, and has moved to a position of sufficiently different directionality that one or more rendering parameters (for example, a lateral offset, or the locations of an exclusion set and an active set of pixels of a Boolean mask) need to be recalculated.

FIG. 19B illustrates an example of operations of a method for providing a multi-view display, according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. In some embodiments, the operations described with reference to FIG. 19B are performed in addition to, or as alternatives to the operations of the example of the methods described with reference to FIGS. 18 and 19A of this disclosure. According to certain embodiments, method 1800 is practiced at a multi-view display apparatus (for example, multi-view display 105 in FIG. 1, multi-view display 200 in FIG. 2, or multi-view display 300 in FIG. 3).

Referring to the non-limiting example of FIG. 19B, at operation 1935, in response to determining at operation 1930 that the tracking target has moved to a range of viewing angles within a second range of viewing angles of the optical multiplexer, the multi-view display controls the filter value of the first pixel based on a rendering of first content for display. As one non-exhaustive example of the practical effect of operation 1935, in certain embodiments, controlling the filter value of the first pixel based on the rendering of first content results in a directional view "following" a viewer to a new viewing position. For example, a directional display directed at first female viewer 1730 in FIG. 17 is adjusted to remain directed at her as she walks around multi-view display, without any adjustment made to pixels used for providing directional displays to first and second male viewers 1720 and 1725.

According to certain embodiments, (for example, embodiments as described with respect to FIG. 16 of this disclosure) wherein the multi-view device generates a separate mask for each directional display, and in each mask, the boundaries between pixels in the active group and pixels in the exclusion group are weighted, at operation 1940, the filter value of the first pixel is controlled based on a weighting of a rendering of the first content for display (for example, mask 1620 in FIG. 16), and a rendering of the second content for display.

In various embodiments according to this disclosure, at operation 1945, the multi-view display receives feedback from a visual sensor (for example, calibration sensor 370 in FIG. 3) from within a viewing angle in the first range of viewing angles. According to various embodiments, the feedback is associated with a deficiency or issue with the directional display (for example, feedback indicating "crooked rendering" (e.g., straight lines are not being rendered as straight lines, or are otherwise distorted), ghosting, or other visual effects which may be improved through rendering adjustments. In some embodiments, as an alternative to, or in addition to receiving feedback, the multi-view display determines distortions or corrections to be made in response to changes detected by field sensors. For example, the multi-view display may detect that the viewers have moved closer together, and on the assumption that the views will appear more distorted, will modify guard regions associated with directional displays.

At operation 1950, in response to receiving feedback from a visual sensor at operation 1945, the multi-view display adjusts a parameter (for example, a value of a slant angle) of one or more Boolean masks used to render directional displays on the multi-view display based on the feedback information.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method of rendering content for display on a multi-view display, comprising:
    assigning a first display to a first pixel of a pixelated array comprising a plurality of pixels periodically spaced along a first axis, the first display associated with a first viewing angle relative to the first axis;
    assigning a second display to a second pixel of the pixelated array, the second display located at a position away from the first pixel along a second axis, the second display associated with a second viewing angle relative to the first axis;
    controlling a filter value of the first pixel based on a rendering of first content for display;
    controlling a filter value of the second pixel based on a rendering of second content for display,
    acquiring, a tracking target by a field sensor connected to the multi-view display;
    determining that the tracking target is located at a first point associated with a viewing angle within a first range of viewing angles of an optical multiplexer, wherein the optical multiplexer is disposed in front of the pixelated array;
    tracking a movement of the tracking target relative to the multi-view display;
    determining that the tracking target has moved to a second point associated with a viewing angle within a second range of viewing angles of the optical multiplexer; and
    responsive to determining that the tracking target has moved to the second point associated with the viewing angle within the second range of viewing angles of the optical multiplexer, controlling the filter value of the second pixel based on the rendering of first content for display,
    wherein the first viewing angle belongs to the first range of viewing angles of the optical multiplexer, and the second viewing angle belongs to the second range of viewing angles of the optical multiplexer.

2. The method of claim 1, wherein the optical multiplexer comprises at least one of a lenticular array or a parallax barrier.

3. The method of claim 1, wherein assigning the first display to the first pixel of the pixelated array comprises:
    determining the first pixel as a member of a group of pixels associated with the first display based on an optical dimension of the optical multiplexer and a spacing interval of pixels of the plurality of pixels of the pixelated array.

4. The method of claim 1, further comprising,
    controlling the filter value of the first pixel based on a weighting of the rendering of first content for display and the rendering of second content for display,
    wherein the weighting of the rendering of first content for display and the rendering of second content for display is determined based on a mask for the first display.

5. The method of claim 4, wherein the mask for the first display is determined based in part on a sub-pixel structure of the first pixel.

6. The method of claim 4, further comprising:
    receiving feedback information from a visual sensor located at a point associated with a viewing angle in the first range of viewing angles; and
    adjusting the mask for the first display based on the feedback information.

7. A multi-view display comprising:
    a pixelated array comprising a plurality of pixels periodically spaced along a first axis;
    an optical multiplexer disposed in front of the pixelated array;
    a processor; and
    a non-transitory memory containing control logic, which, when executed by the processor, causes the multi-view display to:
    assign a first display to a first pixel of the pixelated array, the first display associated with a first viewing angle relative to the first axis,
    assign a second display to a second pixel of the pixelated array, the second display located at a position away from the first pixel along a second axis, the second display associated with a second viewing angle relative to the first axis,
    control a filter value of the first pixel based on a rendering of first content for display,
    control a filter value of the second pixel based on a rendering of second content for display,
    acquiring, a tracking target by a field sensor connected to the multi-view display,
    determining that the tracking target is located at a first point associated with a viewing angle within a first range of viewing angles of the optical multiplexer, tracking a movement of the tracking target relative to the multi-view display, determining that the tracking target has moved to a second point associated with a viewing angle within a second range of viewing angles of the optical multiplexer, and responsive to determining that the tracking target has moved to the second point associated with the viewing angle within the second range of viewing angles of the optical multiplexer, controlling the filter value of the second pixel based on the rendering of first content for display.

8. The multi-view display of claim 7, wherein the optical multiplexer comprises at least one of a lenticular array or a parallax barrier.

9. The multi-view display of claim 7, wherein, when executed by the processor, the control logic further causes the multi-view display to assign the first display to the first pixel of the pixelated array based on a determination that the first pixel is a member of a group of pixels associated with the first display based on an optical dimension of the optical multiplexer and a spacing interval of pixels of the plurality of pixels of the pixelated array.

10. The multi-view display of claim 7, wherein, when executed by the processor, the control logic further configured causes the multi-view display to:

control the filter value of the first pixel based on a weighting of the rendering of first content for display and the rendering of second content for display, wherein the weighting of the rendering of first content for display and the rendering of second content for display is determined based on a mask for the first display.

11. The multi-view display of claim 10, wherein, when executed by the processor, the control logic further causes the multi-view display to determine the mask for the first display based in part on a sub-pixel structure of the first pixel.

12. The multi-view display of claim 10, wherein, when executed by the processor, the control logic further causes the multi-view display to:

receive feedback information from a visual sensor located at a point associated with a viewing angle in the first range of viewing angles, and adjust the mask for the first display based on the feedback information.

13. A non-transitory computer-readable medium comprising instructions, which, when executed by a processor, cause a multi-view display to:

assign a first display to a first pixel of a pixelated array comprising a plurality of pixels periodically spaced along a first axis, the first display associated with a first viewing angle relative to the first axis;

assign a second display to a second pixel of the pixelated array, the second display located at a position away from the first pixel along a second axis, the second display associated with a second viewing angle relative to the first axis;

control a filter value of the first pixel based on a rendering of first content for display; and control a filter value of the second pixel based on a rendering of second content for display;

acquire a tracking target by a field sensor connected to the multi-view display;

determine that the tracking target is located at a first point associated with a viewing angle within a first range of viewing angles of an optical multiplexer, wherein the optical multiplexer is disposed in front of the pixelated array;

track a movement of the tracking target relative to the multi-view display;

determine that the tracking target has moved to a second point associated with a viewing angle within a second range of viewing angles of the optical multiplexer; and responsive to determining that the tracking target has moved to the second point associated with the viewing angle within the second range of viewing angles of the optical multiplexer, control the filter value of the second pixel based on the rendering of first content for display wherein the first viewing angle belongs to the first range of viewing angles of the optical multiplexer, and the second viewing angle belongs to the second range of viewing angles of the optical multiplexer.

14. The non-transitory computer-readable medium of claim 13, wherein the optical multiplexer comprises at least one of a lenticular array or a parallax barrier.

15. The non-transitory computer-readable medium of claim 13, comprising instructions, which, when executed by the processor, cause the multi-view display to assign the first display to the first pixel of the pixelated array based on a determination that the first pixel is a member of a group of pixels associated with the first display based on an optical dimension of the optical multiplexer and a spacing interval of pixels of the plurality of pixels of the pixelated array.

16. The non-transitory computer-readable medium of claim 13, further comprising instructions, which, when executed by the processor, cause the multi-view display to:

control the filter value of the first pixel based on a weighting of the rendering of first content for display and the rendering of second content for display, wherein the weighting of the rendering of first content for display and the rendering of second content for display is determined based on a mask for the first display.

17. The non-transitory computer-readable medium of claim 16, further comprising instructions, which, when executed by the processor, cause the processor to:

receive feedback information from a visual sensor located at a point associated with a viewing angle in the first range of viewing angles; and adjust the mask for the first display based on the feedback information.

* * * * *